United States Patent
Kiani et al.

(10) Patent No.: US 7,042,562 B2
(45) Date of Patent: May 9, 2006

(54) SYSTEMS AND METHODS FOR INSPECTING AN OPTICAL INTERFACE

(75) Inventors: Sepehr Kiani, Watertown, MA (US); David Jacob Gessel, Oakland, CA (US); Andrew Wilson, Cambridge, MA (US)

(73) Assignee: Amphenol Corp., Wallingford, CT (US)

( * ) Notice: Subject to any disclaimer, the term of this patent is extended or adjusted under 35 U.S.C. 154(b) by 226 days.

(21) Appl. No.: 10/329,881

(22) Filed: Dec. 26, 2002

(65) Prior Publication Data

US 2004/0125366 A1   Jul. 1, 2004

(51) Int. Cl.
*G01N 21/88* (2006.01)
*G01N 21/00* (2006.01)

(52) U.S. Cl. .................................. 356/237.1; 356/73.1

(58) Field of Classification Search .. 356/237.1–237.3, 356/73.1, 72–73; 250/227.28, 227.29, 559.23; 385/60, 78; 29/407; 156/297, 299, 277, 156/247; 428/195, 426
See application file for complete search history.

(56) References Cited

U.S. PATENT DOCUMENTS

| | | | |
|---|---|---|---|
| 3,209,301 A | 9/1965 | Duffy, Jr. ..................... 339/22 |
| 4,088,386 A | 5/1978 | Hawk ....................... 350/96.21 |
| 4,158,476 A | 6/1979 | McCartney ............. 350/96.21 |
| 4,258,977 A | 3/1981 | Lukas et al. ............. 350/96.21 |
| 4,277,135 A | 7/1981 | Schrott et al. ........... 350/96.21 |
| 4,436,366 A | 3/1984 | Abramson ................. 350/96.2 |
| 4,456,351 A | 6/1984 | Hiramatsu et al. .......... 354/402 |
| 4,469,398 A | 9/1984 | De Baets et al. .......... 350/96.2 |
| 4,613,105 A | 9/1986 | Genequand et al. ........ 248/178 |
| 4,787,706 A | 11/1988 | Cannon et al. ............ 350/96.2 |
| 4,904,036 A | 2/1990 | Blonder .................... 350/96.11 |
| 5,073,000 A | 12/1991 | Derfiny ........................ 385/14 |
| 5,082,344 A | 1/1992 | Mulholland et al. .......... 385/60 |
| 5,121,454 A | 6/1992 | Iwano et al. .................. 385/60 |
| 5,123,073 A | 6/1992 | Pimpinella ................... 385/59 |
| 5,144,611 A | 9/1992 | Engler et al. ................. 369/71 |
| 5,177,557 A * | 1/1993 | Yamane ..................... 356/73.1 |
| 5,179,419 A * | 1/1993 | Palmquist et al. ......... 356/73.1 |
| 5,204,925 A | 4/1993 | Bonanni et al. .............. 385/89 |
| 5,220,407 A * | 6/1993 | Yamane et al. ............. 356/625 |

(Continued)

FOREIGN PATENT DOCUMENTS

DE    196 53 754 A1    7/1998

(Continued)

OTHER PUBLICATIONS

3M Utilities and Telecommunications: VOL-0570 VF-45™ Maintenance Cleaning Kit; http://products.3m.com/us/util_telecom/products/tsdvolition.jhtml?powurl=GSN8925771gs; Visited Site on Apr. 24, 2002; 2 Pages.

(Continued)

*Primary Examiner*—Gregory J. Toatley, Jr.
*Assistant Examiner*—Sang H. Nguyen
(74) *Attorney, Agent, or Firm*—BainwoodHuang; David E. Huang, Esq.

(57) ABSTRACT

A system enables inspection of an optical connector. The system includes a positioning subassembly, an electronic sensor (e.g., a scanner, a camera, etc.), and a controller coupled to the positioning subassembly and the electronic sensor. The controller is configured to position the electronic sensor over the optical connector, activate the electronic sensor to obtain a set of electronic signals which defines a set of current images of the optical connector, and electronically generate a result based on the set of electronic signals. The result indicates an attribute of the optical connector. Accordingly, the system is capable of inspecting the optical connector in a repeatable and non-subjective manner.

39 Claims, 23 Drawing Sheets

U.S. PATENT DOCUMENTS

| | | | | |
|---|---|---|---|---|
| 5,220,703 | A | | 6/1993 | Kanayama et al. ......... 15/210.1 |
| 5,257,332 | A | | 10/1993 | Pimpinella .................... 385/59 |
| 5,283,851 | A | | 2/1994 | Vergnolle .................... 385/134 |
| 5,337,396 | A | | 8/1994 | Chen et al. .................... 385/92 |
| 5,347,698 | A | * | 9/1994 | Kinoshita et al. ......... 29/407.04 |
| 5,348,487 | A | | 9/1994 | Marazzi et al. ............. 439/138 |
| 5,379,362 | A | | 1/1995 | Kawamura .................... 385/92 |
| 5,394,503 | A | | 2/1995 | Dietz, Jr. et al. ........... 385/135 |
| 5,425,831 | A | | 6/1995 | Grimes et al. .............. 156/179 |
| 5,459,564 | A | * | 10/1995 | Chivers ...................... 356/73.1 |
| 5,513,293 | A | | 4/1996 | Holland et al. ............. 385/134 |
| 5,598,494 | A | | 1/1997 | Behrmann et al. ............. 385/59 |
| 5,598,495 | A | | 1/1997 | Rittle et al. .................... 385/75 |
| 5,640,246 | A | * | 6/1997 | Castonguay ................ 356/445 |
| 5,724,127 | A | * | 3/1998 | Csipkes et al. ............ 356/73.1 |
| 5,725,154 | A | | 3/1998 | Jackson ....................... 239/135 |
| 5,768,738 | A | | 6/1998 | Lee ........................... 15/210.1 |
| 5,770,001 | A | * | 6/1998 | Nagayama et al. ......... 156/350 |
| 5,778,123 | A | | 7/1998 | Hagan et al. ................. 385/76 |
| 5,838,856 | A | | 11/1998 | Lee ............................... 385/54 |
| 5,845,028 | A | | 12/1998 | Smith et al. .................... 385/59 |
| 5,845,036 | A | | 12/1998 | DeMarchi .................... 385/139 |
| 5,920,670 | A | | 7/1999 | Lee et al. ...................... 385/78 |
| 5,940,560 | A | | 8/1999 | DeMarchi et al. ............. 385/58 |
| 6,005,991 | A | | 12/1999 | Knasel ......................... 385/14 |
| 6,041,652 | A | | 3/2000 | Stewart .................... 73/504.04 |
| 6,205,700 | B1 | | 3/2001 | Rigby et al. ................... 43/79 |
| 6,233,376 | B1 | | 5/2001 | Updegrove .................. 385/14 |
| 6,259,840 | B1 | | 7/2001 | Munoz-Bustamante et al. .......... 385/39 |
| 6,270,262 | B1 | | 8/2001 | Hudgins et al. .............. 385/88 |
| 6,296,398 | B1 | | 10/2001 | Lu ............................... 385/60 |
| 6,300,082 | B1 | | 10/2001 | Erb et al. ..................... 435/7.1 |
| 6,304,690 | B1 | | 10/2001 | Day ............................ 385/24 |
| 6,305,848 | B1 | | 10/2001 | Gregory ....................... 385/53 |
| 6,361,218 | B1 | | 3/2002 | Matasek et al. .............. 385/60 |
| 6,419,399 | B1 | | 7/2002 | Loder et al. .................. 385/53 |
| 6,518,997 | B1 | * | 2/2003 | Chow et al. ................ 348/126 |

FOREIGN PATENT DOCUMENTS

| | | |
|---|---|---|
| EP | 0 813 083 A1 | 12/1997 |
| EP | 1 048 963 A1 | 11/2000 |
| JP | 63-285961 | 10/1988 |
| JP | 05040074 A * | 2/1993 |
| JP | 05118830 A * | 5/1993 |
| JP | 10-74884 | 3/1998 |
| WO | WO 98/14810 | 4/1998 |
| WO | WO 99/13367 | 3/1999 |
| WO | WO 03/102656 A2 | 12/2003 |

OTHER PUBLICATIONS http:// ;multimedia.mmm.com/ mws/ mediawebserver.dyn ?666666Ozjcf6Ivs6Evs666tQ3c7rr; Visited Site on Apr. 24, 2002; 1 Page of Picture.

European Patent Office; Patent Abstracts of Japan; Publication No.: 2002031739; Publication Date: Jan. 31, 2002; Application No.: 2000215365; Applicant: NTT Advanced Technology Corp.; 1 Page.

WO 98 35821 A (Soes Lucas; Blieck Roland Trsitan De (NL); Broeksteeg Johannes Mar) Aug. 20, 1998.

New York Institute of Photography; Tips for Better Photographs; http://www.nyip.com/sub_idx_pgs/referidx.camera_corner_0599.html; 4 pages.

WO 03 021320 (Teradyne Inc.) Mar. 13, 2003.

Molex, HBMT™ MT High Density Backplane Interconnect System, Mounting Style: Rivet or Screw, Housing: UL V-O.

Partial International Search Report from PCT/US03/40293, 2 pages.

* cited by examiner

SYSTEMS AND METHODS FOR INSPECTING AN OPTICAL INTERFACE

BACKGROUND OF THE INVENTION

A typical fiber optic component (e.g., a fiber optic network cable, a fiber optic transducer, etc.) includes an optical connector which is configured to form a set of fiber optic connections (i.e., one or more fiber optic connections) with a corresponding fiber optic connector. One type of fiber optic connector includes a ferrule (e.g., a precision-molded ceramic, metal, silicon, glass or plastic part) which holds a set of fiber ends (e.g., one end, four ends, eight ends, 12 ends, etc.). The set of fiber ends and the surrounding ferrule surface of each ferrule defines an optical interface. The manner in which the ferrule holds the set of fiber ends typically defines one of several standard optical interface formations (e.g., an MT ferrule which holds a 1×4 array of fiber ends, a 2×4 array, a 1×12 array, etc.).

Fiber optic equipment manufacturers and users of such equipment strive to keep the optical interfaces of their optical connectors clean and free of damage to maximize light energy transfer and to minimize signal degradation of the light signals exchanged between the optical interfaces. Otherwise, contamination (e.g., oil, dirt, etc.) and/or surface imperfections (e.g., scratches, protrusions, dents, etc.) at one or more of the optical interfaces could result in malformed fiber optic connections that provide improper light signal transfer (e.g., degradation or loss of a light signal). In some situations, a technician can disconnect optical connectors, clean the optical interfaces of the optical connectors, and reconnect the optical connectors to improve the quality and reliability of the fiber optic connections formed therebetween. If cleaning is unsuccessful, the technician may need to replace one or more of the fiber optic components in order to obtain a set of reliable fiber optic connections.

There are a variety of conventional approaches to inspecting optical interfaces of optical connectors. In one approach (hereinafter called "the real-time approach", a user visually examines a component's optical interface in real time such as through a microscope or an electronic imaging camera. In another approach (hereinafter called "the static approach"), the user captures static pictures of the component's optical interface using an electronic imaging camera, and subsequently studies the static pictures (perhaps with the assistance of conventional scratch detection software). Both of these approaches can be performed either at the manufacturer's facility (e.g., by a repair/rework person at a workstation) or in the field (e.g., by a field service person at an installation site) in an attempt to diagnose a cause of poor fiber optic communications. In both approaches, the user looks at the ferrule surface and the fiber ends and tries to spot significant contamination and/or imperfections in the optical interface. If the user sees what could be the cause of significant light energy loss or light signal distortion (e.g., a scratched fiber end and ferrule surface due to careless handling or cleaning procedures), the user can either clean or replace the fiber optic component.

SUMMARY

Unfortunately, there are deficiencies in the above-described conventional approaches to inspecting optical interfaces of optical connectors. For example, in both the above-described conventional real-time and conventional static approaches, it is the user that qualitatively determines whether the optical interfaces are contaminated or damaged. That is, the user makes judgment decisions based on user's expertise and experience in diagnosing such situations. Such tasks are thus prone to inconsistency and subjectivity. In particular, quite easily one user could judge a particular optical interface to be fine and properly functional, while another user judges the same optical interface to be problematic and a significant source of poor fiber optic communications.

Additionally, both conventional approaches are significantly labor intensive. In particular, in the real-time approach, the user must steadily hold equipment (e.g., the component, a microscope, an electronic imaging camera, etc.) while visually examining optical interfaces. In the static approach, the user must still correctly position the electronic imaging camera manually to capture a reliable static picture of the optical interfaces. Such tasks may be difficult and require a significant amount of dexterity and time to manipulate the equipment, particularly if the optical interfaces are disposed in remote locations (e.g., if the optical interfaces are disposed inside card cages). Moreover, the user does not have a mechanism for automatically centering, focusing, and inspecting fiber ends individually, and for stepping through multiple fiber ends in an automated manner.

Furthermore, even if the user is successful in discovering a contaminated or damaged optical interface, the user may not be able to discover the source of the contamination or damage. In particular, it may be difficult or even impossible for the user to simply look at the optical interface (or picture) and discern whether the contamination or damage likely occurred while in possession of the manufacturer or at the customer site.

The invention is directed to techniques for inspecting an optical connector which involves electronically generating a result indicating an attribute of the optical connector (e.g., "PASS", "FAIL", a score indicating a degree of damage, a coordinate of a defective fiber end, etc.). Such techniques reduce the amount of manual effort and time required by the user relative to the above-described conventional approaches since the optical connector is capable of being automatically evaluated for the user. Additionally, the results tend to be consistent and reliable since there is little or no opportunity for user subjectivity.

One embodiment of the invention is directed to a system for inspecting an optical connector. The system includes a positioning subassembly, an electronic sensor (e.g., a scanner, a camera, etc.), and a controller coupled to the positioning subassembly and the electronic sensor. The controller is configured to (i) position the electronic sensor over the optical connector, (ii) activate the electronic sensor to obtain a set of electronic signals which defines a set of current images of the optical connector, and (iii) electronically generate a result based on the set of electronic signals. The result is a metric of an attribute of the optical connector. Accordingly, the system is capable of inspecting the optical connector in a repeatable and non-subjective manner.

In one arrangement, the positioning subassembly includes a card-shaped member, and a set of actuators which couples the electronic sensor to the card-shaped member. This arrangement is well-suited for inspecting an optical connector which is disposed within a backplane which resides in a fixed position relative to a card cage. For example, the user can simply insert the card-shaped member into the card cage, and coarsely position the electronic sensor over the optical connector. The controller can then provide a set of actuator signals to the set of actuators (e.g., in response to the push of a button) to move the electronic sensor relative to the card-shaped member and over the optical connector disposed within the backplane to inspect the optical connector. Accordingly, there is no need for the user to exert time and effort holding equipment in awkward or uncomfortable positions in a significantly narrow space with limited access (e.g., a card cage).

In one arrangement, the system further includes a set of shutters, and a set of motors coupled to the controller. The controller is configured to actuate the set of motors to move the set of shutters between a first orientation which covers the electronic sensor and a second orientation which exposes the electronic sensor. Accordingly, this arrangement is capable of protecting the electronic sensor (and associated optics) against contamination until the time of obtaining the set of electronic signals defining the images In one arrangement, the optical connector includes a set of identifiers (e.g., barcodes, RF tags, etc.), and the controller is configured to acquire the set of identifiers. Accordingly, the manufacture can store prior images and analysis results of optical connectors in a database prior to shipment, and the user can use the set of identifiers as a key to retrieve the stored prior images and analysis results from the database for comparison with the set of current images of the optical connector defined by the electronic signals obtained from the electronic sensor. If the images or analysis results differ significantly, the user confidently knows that the optical connector has sustained contamination and/or damage since leaving the manufacturer's possession.

In some arrangements, the system further includes a light source that facilitates the system's ability to obtain detailed images. In one arrangement, the light source provides bright field illumination. In one arrangement, the light source provides dark field illumination. In another arrangement, the light source provides substantially polarized light. In yet another arrangement, the light source provides substantially short-wavelength light (e.g., blue light). In another arrangement, the light source provides coaxial illumination (i.e., light down the center of an objective). Different types of lighting may reveal different details of the optical connector, e.g., the optical interface under inspection.

It should be understood that a variety of electronic sensors are well-suited for obtaining the set of images of the optical connector. In one arrangement, the electronic sensor includes a linear array of sensor elements (e.g., to scan the optical interface of the optical connector). In one arrangement, the electronic sensor is a two-dimensional array of sensor elements. In some arrangements, the electronic sensor aims and/or focuses on different points of the optical connector using optics. In one arrangement, the electronic sensor includes an array of flexible fibers imaging the optical connector in a pixelized manner. In one arrangement, the electronic sensor includes a fiber optic taper (i.e., a rigid bundle of fibers fused together that provides magnification and convey an image from one end of the bundle to another). The manufacturer of the system can offer a variety of electronic sensor selections based on particular desired applications, cost, off-the-shelf component availability, etc.

Essentially, the electronic sensor has the flexibility to accommodate a variety of optical configurations. In one arrangement, the electronic sensor uses bulk optics (e.g., a set of lenses). In another arrangement, the electronic sensor uses a rigid fiber optic structure (e.g., a fiber topic faceplate or taper). In yet another arrangement, the electronic sensor uses a flexible fiber optic structure (e.g., a flexible fiber optic bundle).

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Overview

The invention is directed to techniques for inspecting an optical connector which involves electronically generating a result indicating an attribute of the optical connector (e.g., "GOOD", "BAD", a score or rating indicating in a degree of damage, a coordinate of a defective fiber end, etc.). Such techniques tend to reduce the amount of manual effort and time required by the user relative to conventional approaches of studying optical interface images in real-time, or studying static pictures of optical interface images since the optical connector is capable of being characterized automatically for the user. Furthermore, the electronically generated result tends to be more consistent and reliable since there is little or no opportunity for user subjectivity and/or error.

Figure 1:
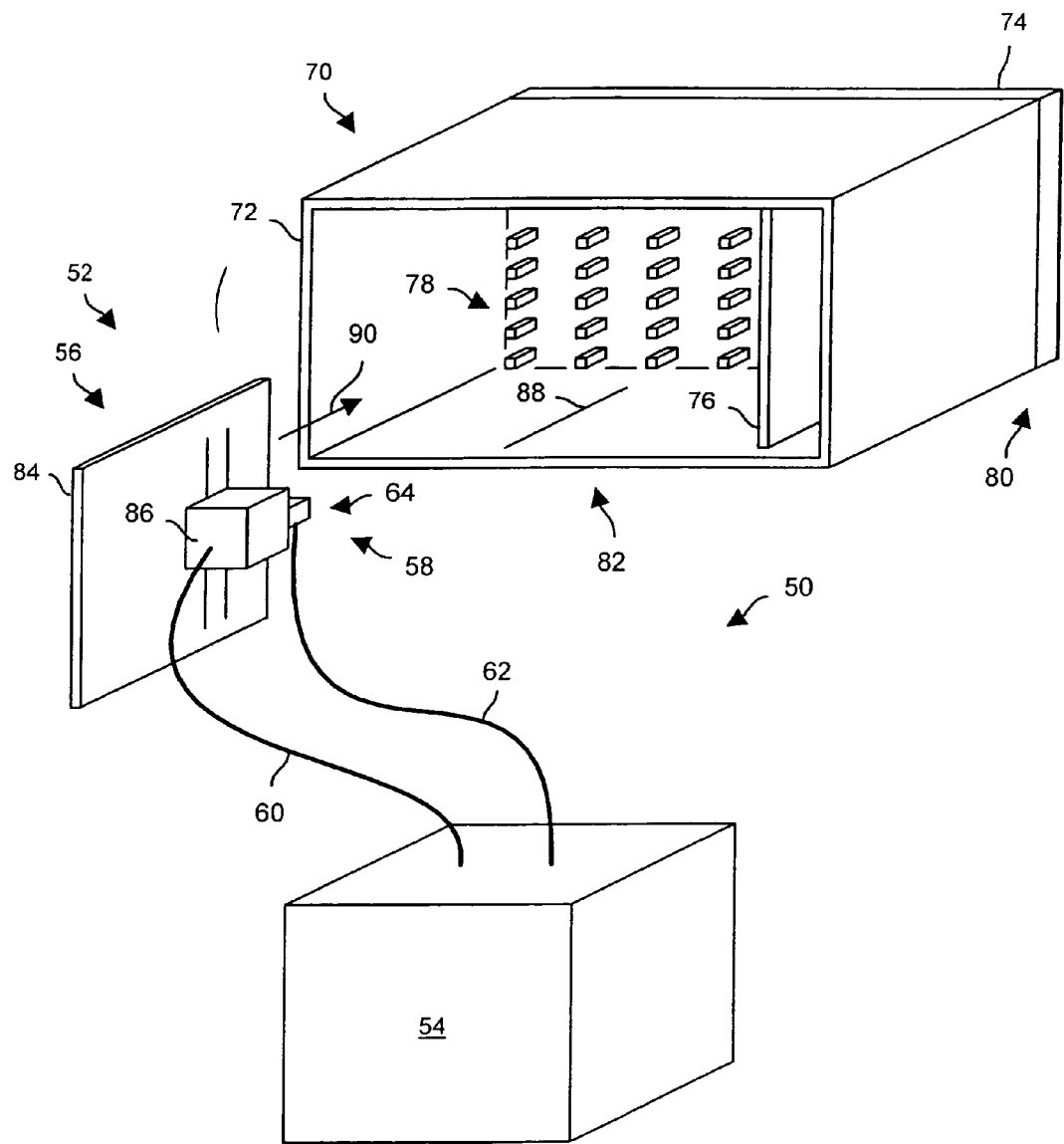
FIG. 1 is a perspective view of an inspection system which is suitable for use by the invention.

FIG. 1 shows an inspection system 50 which is suitable for use by the invention. The inspection system 50 includes an inspection assembly 52 and a controller 54. The inspection assembly 52 includes a positioning subassembly 56 and a sensor subassembly 58. The controller 54 communicates with the positioning subassembly 56 through a communications link 60 (e.g., a cable, wireless communications, etc.), and with the sensor subassembly 58 through another communications link 62. As will be explained in further detail later, the sensor subassembly 58 includes a set of electronic sensors 64 (shown generally by the arrow 64 in FIG. 1) which is capable of providing electronic signals defining images of optical connectors (e.g., ferrule endfaces). In turn, the controller 54 is configured to analyze the electronic signals to determine attributes about the optical connectors (e.g., the existence of defects, a score, etc.) in a reliable and repeatable manner. In particular, the controller 54 provides a mechanism for the user to automatically center, focus, and inspect fiber ends individually, and to stepping through multiple fiber ends in an automated manner.

The inspection system 50 is capable of operating in conjunction with a fiber optic system 70. By way of example only, the fiber optic system 70 includes a card cage 72, a backplane 74 and circuit boards 76. The backplane 74 includes columns of optical connectors 78 and mounts to a back 80 of the card cage 72. The circuit boards 76 are configured to insert through a front 82 of the card cage 72 so that corresponding optical connectors on the circuit boards 76 mate with the optical connectors 78 on the backplane 74 to form sets of fiber optic connections.

As shown in FIG. 1, the positioning subassembly 56 of the inspection assembly 52 includes a card-shaped (or circuit board shaped) member 84 and a set of actuators 86 which couples the sensor subassembly 58 to the card-shaped member 84. As will be explained in further detail later, there are a variety of actuator and sensor configurations which are suitable for use by the inspection assembly 52. The card-shaped member 84 has a size and shape similar to that of the circuit boards 76 and operates as a support or base for the sensor subassembly 58. Accordingly, a user can remove a circuit board 76 from an installed position 88 within the card cage 70 (e.g., from a slot of the card cage 72) and, in its place, insert the inspection assembly 52 (i.e., the positioning subassembly 56 which carries the sensor subassembly 58). As a result, with very little manual effort, the user is capable of accessing fiber endfaces (i.e., optical interfaces of ferrules) deeply within a fiber optic system essentially through a narrow slot (e.g., a 16 mm wide circuit board slot) which otherwise is difficult or even impossible to reach with a human hand.

It should be understood that the inspection system 50 is well-suited to operate at a static location such as at a workstation on the floor of a fiber optic component manufacturer. The inspection system 50 is also well-suited to operate in the field as a portable device mounted to a portable cart with a portable power supply. Accordingly, a technician can bring the inspection system 50 to customer location and diagnose issues at installed fiber optic systems 70. In one arrangement, the inspection system 50 resides on a portable cart with a cleaning system so that the user can clean the optical connectors 78 before and/or after inspection. A cleaning system which is suitable for use with the inspection system 50 is described in U.S. patent application Ser. No. 10/156,905, which is entitled "Methods and Apparatus for Cleaning Optical Connectors" and assigned to the same Assignee as the current Application, the teachings of which are hereby incorporated by reference in their entirety. Further details of the invention will now be provided with reference to FIG. 2.

Figure 2:
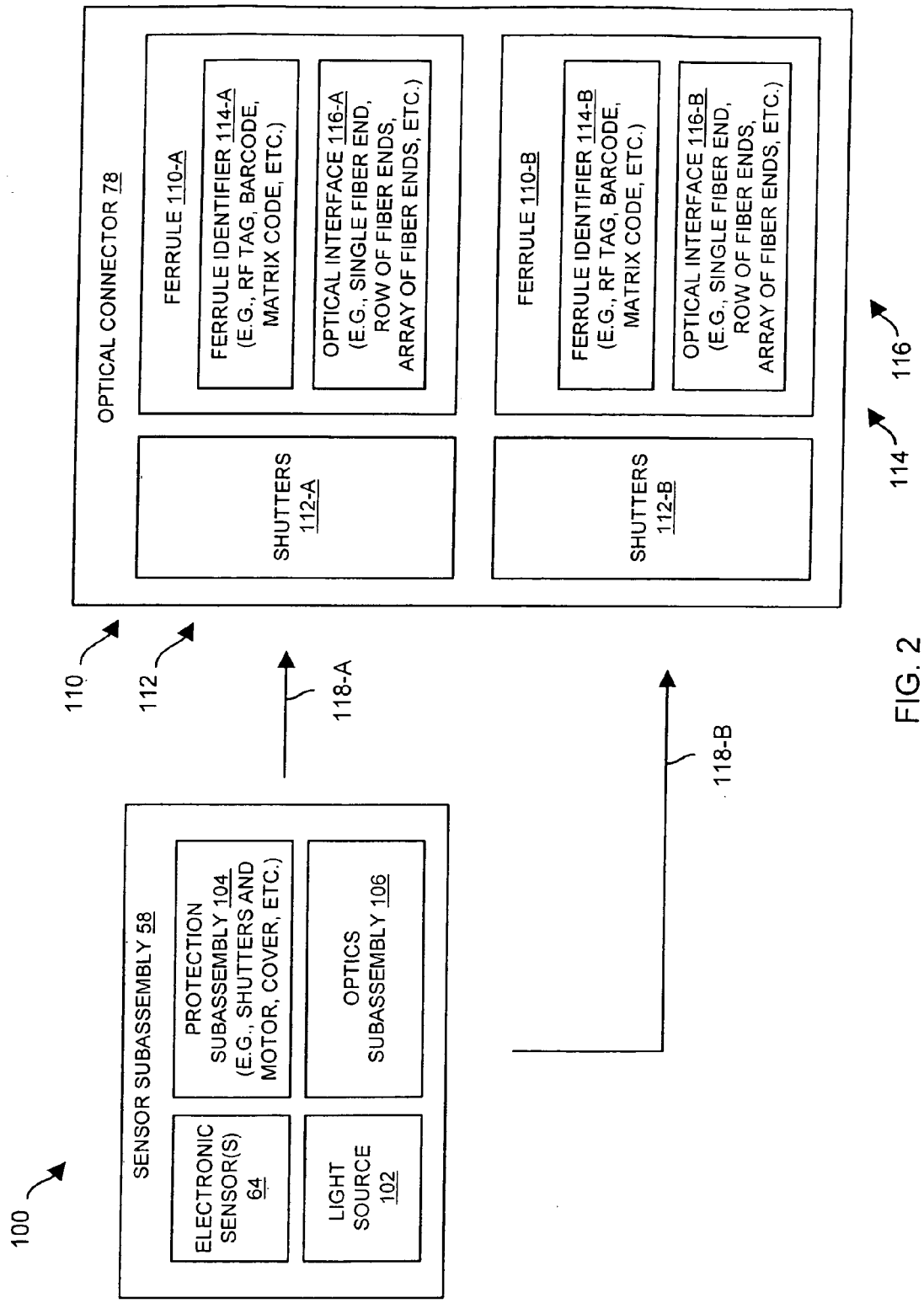
FIG. 2 is a block diagram of the sensor subassembly of the inspection system of FIG. 1 relative to an optical connector under inspection.

FIG. 2 is a block diagram 100 of the sensor subassembly 58 of the inspection system relative to an optical connector 78 of the backplane 74. The sensor subassembly 54 includes a set of electronic sensors 64, a light source 102, a protection subassembly 104 and an optics subassembly 106. In general, the protection subassembly 104 (e.g., a coordinated arrangement of motorized shutters, a cover, etc.) protects the set of electronic sensors 64, the light source 102 and the optics subassembly 106 against damage and contamination. At inspection time, the protection subassembly 104 moves from a first orientation which covers the components 64, 102, 106 to a second orientation which exposes the components 64, 102, 106 allowing them to operate properly in order to obtain images of the optical connector 78 under inspection.

By way of example only, the optical connector 78 includes multiple ferrules 110-A, 110-B (collectively, ferrules 110), and shutters 112-A, 112-B (collectively, shutters 112) which respectively protect the ferrules 110-A, 110-B. Each ferrule 110 includes a ferrule identifier 114 and an optical interface 116. In particular, the ferrule 110-A includes a ferrule identifier 114-A and an optical interface 116-A, and the ferrule 110-B includes a ferrule identifier 114-B and an optical interface 116-B.

Each ferrule identifier 114 uniquely identifies that ferrule 114 among other ferrules 114. In some arrangements, the manufacturer provides the ferrule identifier 114 to the ferrule 110 and, just prior to sealing the ferrule 114 in a tamper-proof shipping container, captures images of the optical interface 116 of that ferrule 110. The manufacturer then stores the images in a database, and manufacturer is capable of retrieving the stored images from the database at a later time based on the ferrule identifier 114. In some arrangements, in addition to storing the images or as an alternative to storing the images, the manufacturer stores inspection results pertaining to the ferrules 110 (e.g., interferometric data based on the captured images, graphs, reports, a reduced set of inspection information, a composite image or a 3-dimensional representation, combinations thereof, etc.).

In some arrangements, the ferrule identifier 114 is a radio frequency (RF) tag which provides a unique RF signature signal when exposed to particular radio frequency energy. The manufacturer places the RF tag in the ferrule 110 when forming the ferrule 110 (e.g., the manufacturer embeds the RF tag when terminating a fiber optic cable with a ceramic, metal or epoxy-type ferrule 110). Preferably, the RF tag resides near the ferrule surface that forms, with a set of fiber ends, the optical interface 116 of that ferrule 110.

In other arrangements, the ferrule identifier 114 is a digital code such as a barcode (a one-dimensional digital code) or a matrix code (a two-dimensional digital code). In this arrangement, the manufacturer places the digital code on the ferrule surface that forms, with a set of fiber ends, the optical interface 116 after polishing the optical interface 116 of that ferrule 110. In one arrangement, the digital code is written into the ferrule surface using a laser. In another arrangement, the digital code is micro-printed onto the ferrule surface using a micro-printing process.

It should be understood that the shutters 112 of the optical connector 78 are configured to actuate in response to the optical connector 78 mating with a corresponding optical connector (i.e., an optical connector on one of the circuit boards 76, also see FIG. 1). Preferably, the structure of the sensor subassembly 58 mimics that of a corresponding optical connector so that, when the sensor subassembly 58 comes into close proximity to the optical connector 78 under inspection, the sensor subassembly 58 actuates the shutters 112 to expose the ferrule identifiers 114 and the optical interfaces 116 of the ferrules 110 in a similar manner. In one arrangement (e.g., a hand operated device), the sensor subassembly 58 actuates the shutters 112 of the optical connector in response to user hand movements (e.g., the user moving the hand operated device toward the optical connector 78). In another arrangement, the positioning subassembly 56 allows the user to manually position the sensor subassembly 58 in line with the optical connector 78 (e.g., manually index the sensor subassembly 58 along a set of standard ratchet locations along the edge of the card-shaped member 84), and the sensor subassembly 58 actuates the shutters 112 as the user completes insertion of the inspection assembly 52 into the card cage 72. In another arrangement, the user fully inserts the inspection assembly 52 into the card cage 72, and the controller 54 directs the sensor subassembly 58 (e.g., by operating the set of actuators 86, see FIG. 1) toward the optical connector 78 to actuate the shutters 112. An optical connector which is suitable for use as the optical connector 78 is described in U.S. patent application Ser. No. 10/243,458, which is entitled "Techniques for Forming Fiber Optic Connections in a Modularized Manner" and assigned to the same Assignee as the current Application, the teachings of which are hereby incorporated by reference in their entirety.

By way of example only, and as shown by the arrows 118-A, 118-B, the sensor subassembly 58 is configured to aim at each ferrule 110 one at a time. For example, the positioning subassembly 56 aligns the sensor subassembly 58 with the ferrule 110-A to acquire images of the optical interface 116-A (see the arrow 118-A), and then aligns the sensor subassembly 58 with the ferrule 110-B to acquire images of the optical interface 116-B (se the arrow 118-B). In an alternative arrangement, the inspection system 50 includes multiple sensor subassemblies 58 in order to acquire images of the optical interfaces 116-A, 116-B simultaneously. Further details of the invention will now be provided with reference to FIG. 3.

Figure 3:
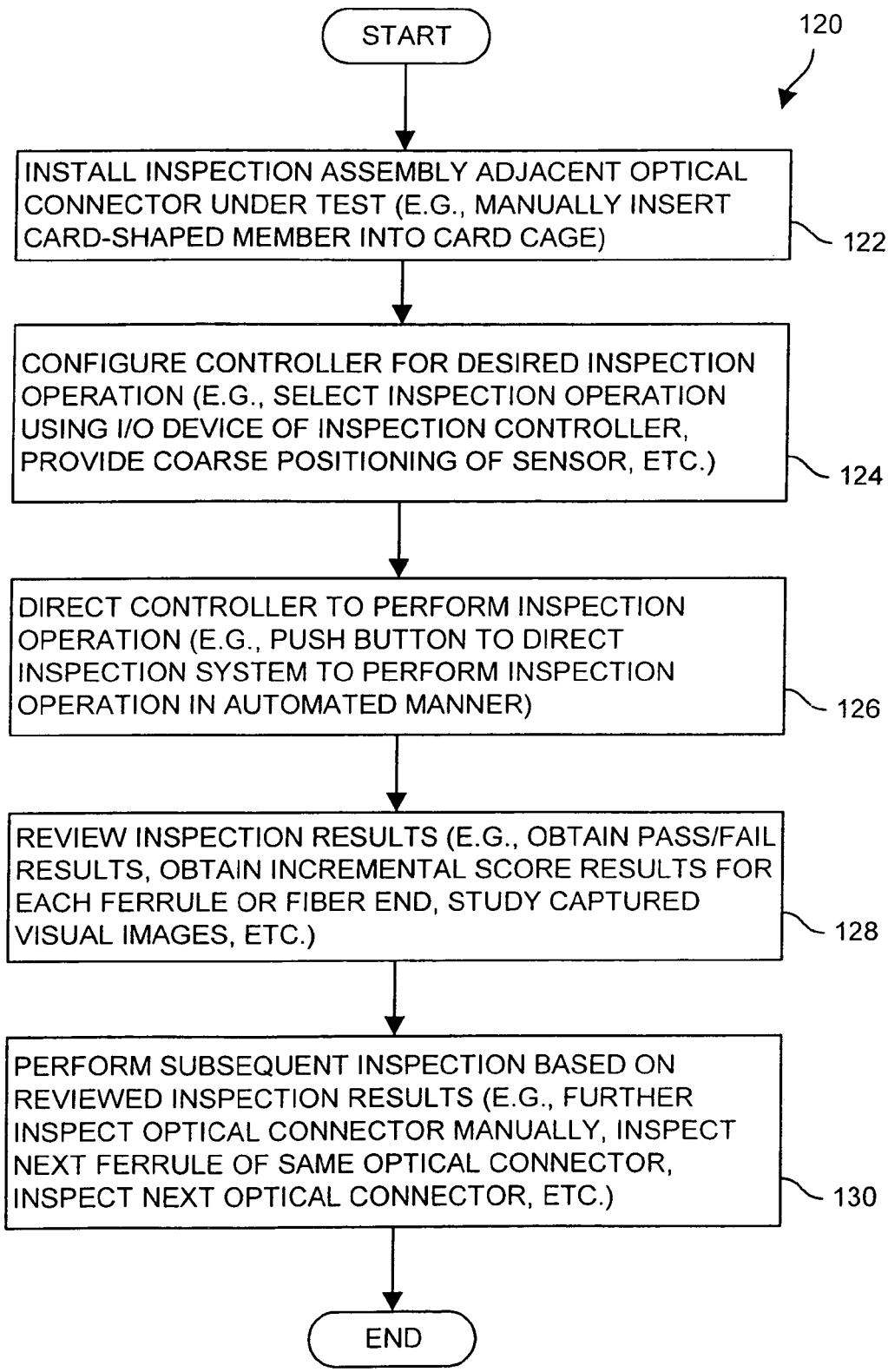
FIG. 3 is a flowchart of a procedure which is performed by a user of the inspection system of FIG. 1.

FIG. 3 shows a procedure 120 which is performed by a user of the inspection system 50 to inspect an optical connector 78 of the fiber optic system 70 (also see FIG. 1). In step 122, the user installs the inspection assembly 52 adjacent the optical connector 78 under inspection. In particular, the user inserts the card-shaped member 84 of the positioning subassembly 56 into the card cage 72 of the fiber optic system 70 (e.g., the user latches the card-shaped member 84 into the card cage 72 in a manner similar to that for a circuit board 76, see FIG. 1).

In step 124, the user configures the controller 54 for a desired inspection operation. For example, as mentioned earlier for certain arrangements, the user coarsely locates the sensor subassembly 58 adjacent the optical connector 78 under inspection. In one arrangement, the user operates an input/output (I/O) device of the controller 54 to position the set of sensors 64 (also see FIG. 2) in line with a particular ferrule 110 of the optical connector 78 (e.g., using actuation signals that move the set of actuators 86 of the positioning subassembly 56, also see FIG. 1). Alternatively, the user manually moves the sensor subassembly 58 in line with the optical connector 78 under inspection (e.g., the user positions the sensor subassembly 58 in one or multiple notched locations along the edge of the card-shaped member 84) prior to fully inserting the inspection assembly 52 into the card cage 72 during step 122.

Additionally, in step 124, the user selects among multiple available inspection operations or routines to discover particular attributes of the optical connector 78. For example, the user can select a first inspection operation in which the controller 54 analyzes images of each optical interface 116 of the optical connector 78 (e.g., performs a pattern recognition operation or an interferometric study, etc.), and renders a PASS/FAIL or GOOD/BAD result for that optical interface 116. The user can also select a second inspection operation in which the controller 54 rates each optical interface 116 along a range (e.g., a contiguous scale where 5.0 indicates no damage, and 1.0 indicates significant damage). The user can also select a third inspection operation in which the controller 54 obtains a set of current optical interface images (e.g., an image of each fiber end) of each optical interface 116, and then compares the set of current images to a set of prior optical interface images stored in a database. For this third inspection operation, if the difference between the current images and the prior images is greater than or equal to a predetermined threshold (e.g., a gray scale comparison), that optical interface 116 is considered to be defective due to having undergone a significant change since leaving the manufacturer's possession. Additionally, in one arrangement, the user can configure the controller 54 to inspect only the particular optical connector 78 under inspection or, when inspection of that optical connector 78 is complete, to proceed to another optical connector 78 until the inspection system 50 has inspected the entire column of optical connectors 78 along the backplane 74.

In step 126, the user directs the controller 54 to perform the selected inspection operation. In one arrangement, the user simply pushes a button (or the like) on the I/O device to begin the inspection operation. The controller 54 then, in an automated manner, proceeds with the selected inspection operation. In particular, the controller 54 captures images of each optical interface 116 of the optical connector 78, and electronically generates a result for the optical connector 78 as a whole (or alternatively for each optical interface 116 of the optical connector 78). This step involves the controller 54 providing signals to the sensor subassembly 104 to finely focus (e.g., automatic focusing) and precisely maneuver the electronic sensors 64 toward various points on the optical connector 78 (e.g., to aim the sensors 64 individually toward each fiber end of each ferrule 110). The controller 54 then generates results which characterize the optical connector 78 (e.g., which describe attributes of each optical interface 116).

In step 128, the user reviews the results of the inspection operation. At this point, the user can simply proceed onto a new step of inspecting another optical connector 78 if the results are positive (e.g., the optical connector 78 receives a PASSing or GOOD grade, the rating of the optical connector 78 exceeds a threshold such as 4.0, etc.). However, if the result are negative (e.g., the optical connector 78 receive a FAILed or BAD grade or a rating below the threshold such as 2.5), the user can further examine the optical connector 78 (e.g., the user can more closely study images of particular fiber ends, the user can perform other analyses on the images, etc.).

In step 130, the user optionally performs a subsequent inspection operation if more information about the inspection system 70 is desired. For example, the user can inspect the same optical connector 78 using a different test or move on to inspect a different optical connector 78. If the user is concerned about the performance of a particular optical connector 78, the user can manually operate the controller 54 and visually inspect the optical connector 78 using the I/O device of the controller 54.

It should be understood that, since the inspection assembly 52 sits inside the card cage 72 of the inspection system 70, the user is not required to exert any more time and effort to hold and position equipment during such further study as is common in conventional inspection approaches. Rather, the inspection assembly 52 supports and steadies the sensor subassembly 58 so that the user can easily and conveniently further examine the optical connector 78 under inspection by simply operating the I/O device of the controller 54 (e.g., pushing buttons). Further details of the invention will now be provided with reference to FIG. 4.

Figure 4:
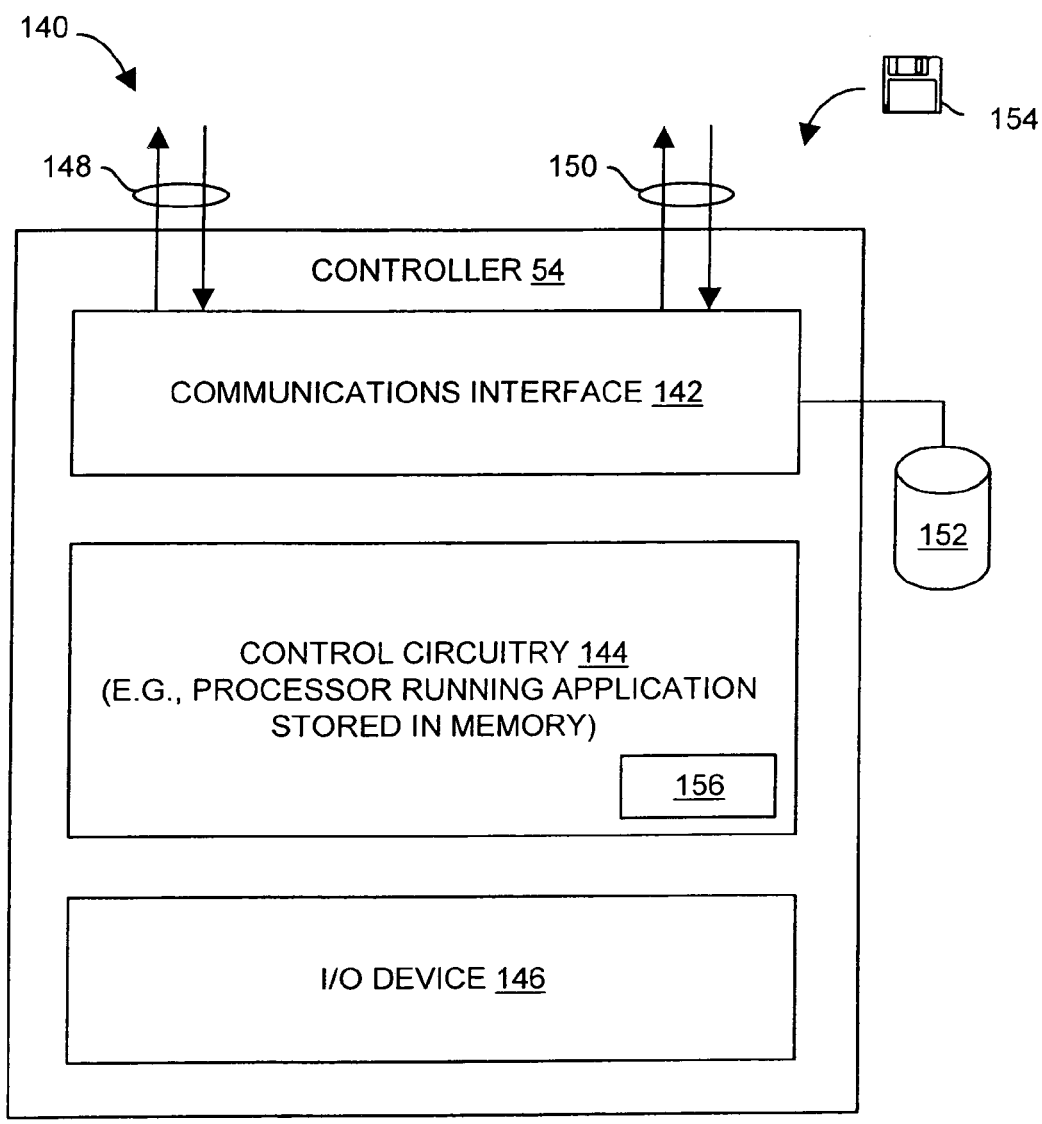
FIG. 4 is a block diagram of a controller of the inspection system of FIG. 1.

FIG. 4 is a block diagram 140 of the controller 54 of the inspection system 50. The controller 54 includes a communications interface 142, control circuitry 144 and an I/O device 146. The communications interface 142 operates as an end point for the communications links 60, 62 (FIG. 1) that respectively couple to the inspection assembly 52. In particular, the communications interface 142 exchanges a first set of signals 148 with the positioning subassembly 56 of the inspection assembly 52 through the link 60. The signals 148 include coarse and fine positioning signals traveling to the positioning subassembly 56 (e.g., actuator and/or focusing signals) and feedback signals returning from the positioning subassembly 56. Similarly, the communications interface 142 exchanges a second set of signals 150 with the sensor subassembly 58. The signals 150 include control signals traveling to the sensor subassembly 58 (e.g., focusing, shutter control and lighting signals) and returning data signals from the sensor subassembly 58 (e.g., ferrule identification signals, current image signals, etc.).

The communications interface 142 also is capable of connecting the controller 54 to an external database 152 of prior optical connector images which enables the controller 54 to better analyze the optical connectors 78 (e.g., through a network connection over the Internet, by reading database information from a CD or memory card, etc.). For example, the controller 54 is capable of performing pattern recognition operations by performing a comparison of current images with standard images within database 152 in order to characterize fiber ends of the optical connectors 78 (e.g., a scratch, contamination, etc.). Furthermore, the controller 54 is capable of performing difference measurements between current images and prior images of the same optical interface 116 in order to determine whether the optical interface 116 has undergone significant exposure to contamination or damage since leaving the manufacturer's possession. By narrowing down a time range when the contamination or damage occurs, the user can better identify the cause or source of contamination or damage.

The I/O device 146 is configured to receive commands from the user and to provide information back to the user. In one arrangement, the I/O device 146 is a laptop computer. In another arrangement, the I/O device 146 is a touch sensitive screen or console. In another arrangement, the I/O device 146 is the combination of a keyboard, a mouse and a display. In another arrangement, the I/O device 146 includes specialized controls and displays (e.g., buttons and LEDs, etc.). The use of the I/O device 146 alleviates the need for the user to manually maneuver and hold the inspection equipment as in conventional inspection approaches. Rather, the user can simply direct the inspection process by operating controls (e.g., buttons, levers, a mouse, etc.) on the I/O device 146.

The control circuitry 144 is configured to accept user commands through the I/O device 146, and to perform inspection operations or routines on optical connectors 78 using the inspection assembly 52 (FIG. 1). In one arrangement, the control circuitry 144 is a processor and memory, wherein the processor runs an application stored in the memory. The application (i.e., a series of instructions that direct the operation of the processor) is available to the control circuitry 144 by way of a computer program product 154 (e.g., a set of diskettes, a set of tapes, a set of CD-ROMs, a network download, read only memory (ROM), etc.). The electronically generated results 156 can thus be stored in the memory of the control circuitry 144 for rendering on the I/O device 146 or for later retrieval (e.g., to collect field data). In another arrangement, the control circuitry 144 includes other types of circuits such as Application Specific Integrated Circuits (ASICs), Field Programmable Gate Arrays (FPGAs), analog circuitry, micro-controllers, an embedded PC, combinations thereof, and the like. Further details of the invention will now be provided with reference to FIG. 5.

Figure 5:
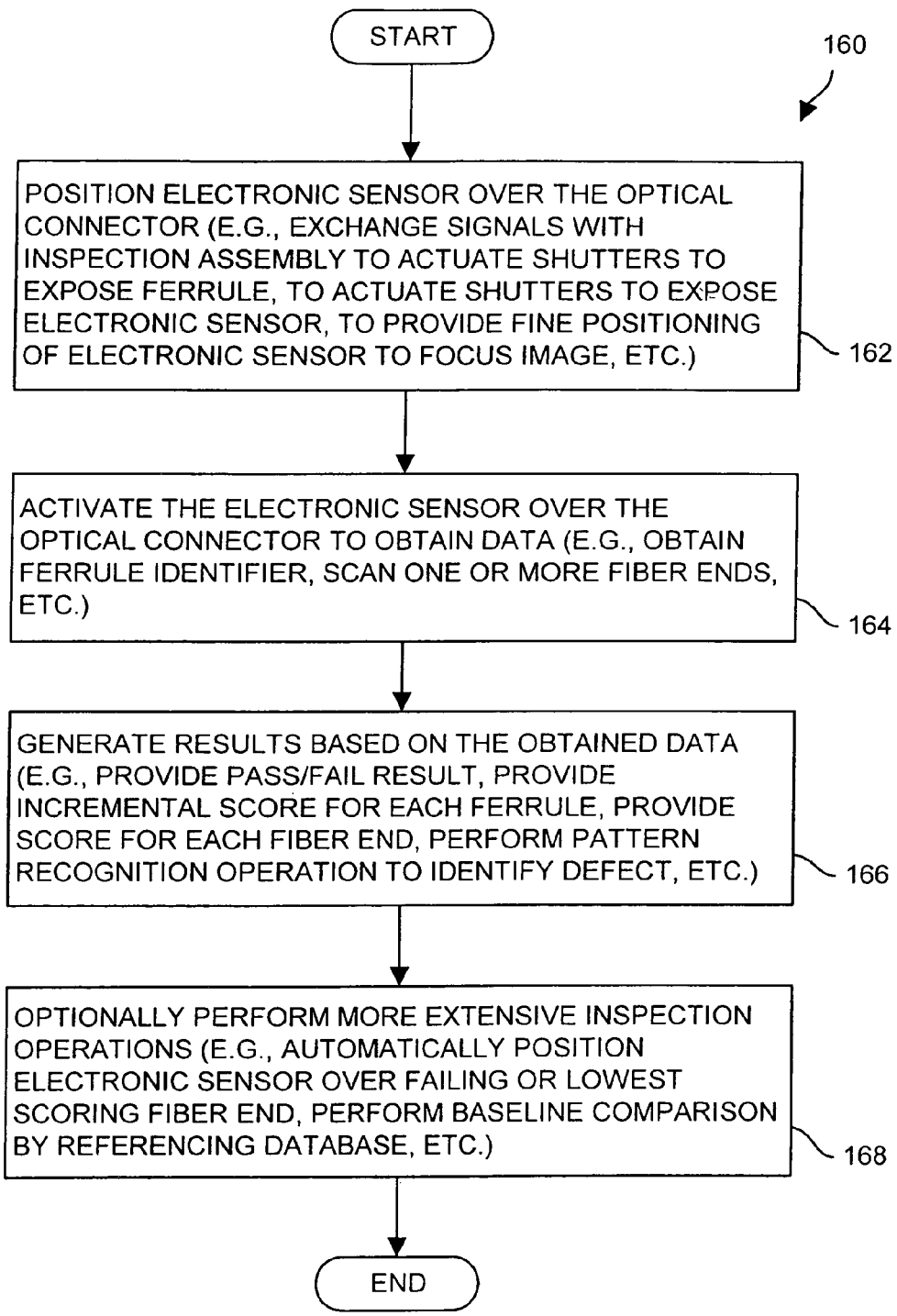
FIG. 5 is a flowchart of a procedure which is performed by the controller of FIG. 4.

FIG. 5 is a flowchart 160 of a procedure which is performed by the controller 54 during step 126 of the earlier-described procedure 120 (also see FIG. 3). In step 162, the controller 54 positions the electronic sensors 64 over the optical connector 78. In particular, controller 54 moves the sensor subassembly 58 toward the connector 78 to open the shutters 112 on the optical connector 78 and to expose the ferrule 110 (or ferrules 110 if the connector 78 includes multiple ferrules 110, as shown in FIG. 2). The controller 54 also sends signals to the inspection assembly 52 to actuate the protection subassembly 104. In response, the protection subassembly 104 moves from a first orientation to a second orientation to expose the electronic sensors 64. The controller 54 then maneuvers the electronic sensors 64 to proper locations and angles for inspection. In particular, the controller 54 precisely aims and focuses the electronic sensors 64 by exchanging signals 150 with the optical subassembly 106 (also see FIG. 2).

In step 164, the controller 54 activates the electronic sensors 64 over the optical connector 78 to obtain data. In particular, the controller 54 reads the ferrule identifier 114 from the ferrule 110. In one arrangement, the ferrule identifier 114 is an RF tag and the electronic sensors 64 activate the RF tag and receive the RF unique RF signature from the RF tag. In another arrangement, the ferrule identifier 114 is a digital code (e.g., a barcode, a matrix code, etc.) and the electronic sensors 64 read the digital code. Additionally, the controller 54 makes sure that the light source 102 is activated, and captures current images of the optical interface 116 (the light source 102 can remain activated continuously or can be turned on at the time of obtaining the images). That is, the controller 54 individually aims the electronic sensors 64 toward the fiber ends of the optical interface 116 and reads, from the electronic sensors 64, image signals 150 which define the fiber end images.

In step 166, the controller 54 generates results based on the data obtained from the electronic sensors 64. As mentioned above, the controller 54 is capable of performing a first routine which provides back a PASS or FAIL grade, a second routine which rates the optical connector 78 (or each ferrule 110) on a scale, or a third routine which compares the current images with prior images (e.g., taken at the factory) to determine the degree of difference between the images (e.g., the optical connector 78 is considered GOOD if the differences do not exceed a pre-established threshold). It should be understood that, in each of these image processing schemes, the controller 54 performs a metric calculation/determination of an attribute of the connector (e.g., the controller formulates a result indicating whether a scratch exists in a critical region of an optical interface 116). Other optical interface analysis schemes are suitable for use as well.

In step 168, controller 54 optionally performs more extensive inspection operations. For example, under direction of the user, the controller 54 is capable of automatically aiming back toward a problematic or poorly graded fiber end or ferrule 110 (e.g., to perform another inspection using a different type of light). Alternatively, the controller 54 is capable of automatically homing the sensor subassembly 58 over the next optical connector 78 if directed to do so by the user.

It should be understood that the controller 54 performs the procedure 160 consistently and impartially. That is, there is little or no opportunity for user subjectively to interfere with rendering the results. Accordingly, the inspection system 50 is capable of inspecting the optical connector 78 in a repeatable and reliable manner. Moreover, the inspection system 50 performs inspection routines with minimal effort and time expended by the user. That is, the user simply installs the inspection assembly 52 (FIG. 1) into the card cage 72 in a manner similar to that for a circuit board 76, configures the inspection system 50 by operating the I/O device 146 of the controller 54, and then lets the inspection system 50 perform the inspection operation in an automated manner.

Further Details and Variations of the Inspection Assembly

The following is a description of a variety of configurations for the inspection assembly 52 of the inspection system 50 of FIG. 1. Each of these configurations is suitable for use for particular components of the positioning subassembly 56 and/or the sensor subassembly 58.

Figure 6:
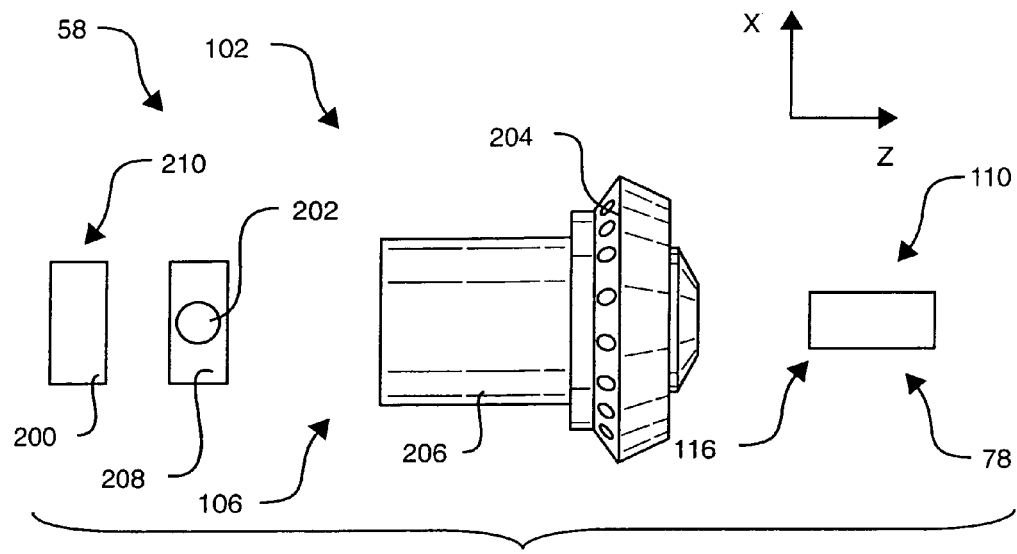
FIG. 6 is a top view of various components of an inspection assembly of the inspection system of FIG. 1 when positioned to obtain an image of an optical interface of an optical connector.
Figure 7:
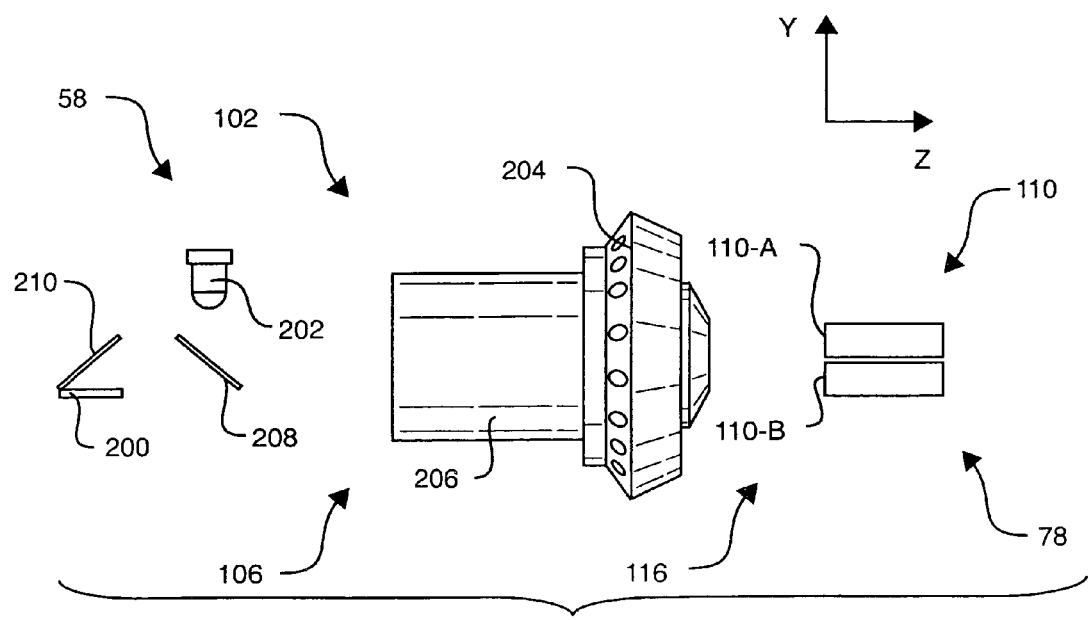
FIG. 7 is a side view of the various components of FIG. 6.

FIGS. 6 and 7 illustrate particular details of the inspection assembly 52 when inspecting a set of ferrules 110 of an optical connector 78 of the fiber optic system 70 of FIG. 1. FIG. 6 is a top view of particular components of the inspection assembly 52, and FIG. 7 is a side view of the components.

As shown in FIGS. 6 and 7, the set of electronic sensors 64 of the sensor subassembly 58 includes an imaging sensor 200 (e.g., a CCD or CMOS sensor). The light source 102 includes an LED 202 and a darkfield illuminator 204. The optics subassembly 106 includes a lens 206 and a coaxial illumination beam splitter 208, i.e., a beam splitter that reflects light from the LED 202 toward the lens 206 and the optical connector 78 under inspection and concurrently allows the image of the optical connector 78 to pass through and onto the imaging sensor 200. By way of example only, the optics subassembly 106 further includes a mirror 210 which redirects the image of the optical connector 78 from one angle to another and onto the imaging sensor 200. As will now be explained in further detail, the components are movable by the actuators 86 in response to signals from the controller 54. Further details of the invention will now be provided with reference to FIGS. 8 and 9.

Figure 8:
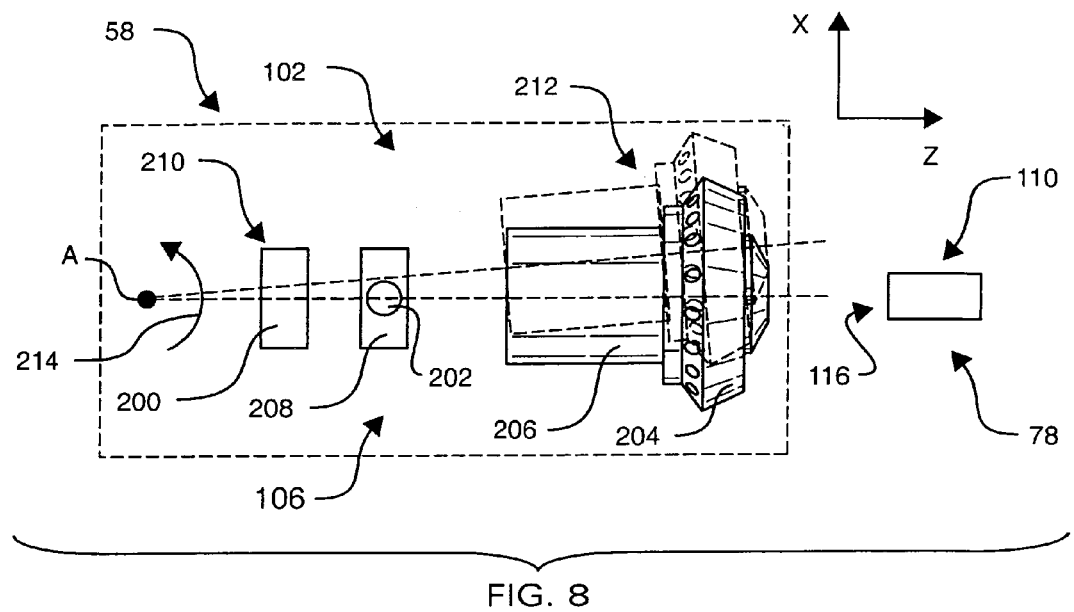
FIG. 8 is a top view of the various components of FIG. 6 when rotating about a point to obtain another image of the optical interface along the X-axis.
Figure 9:
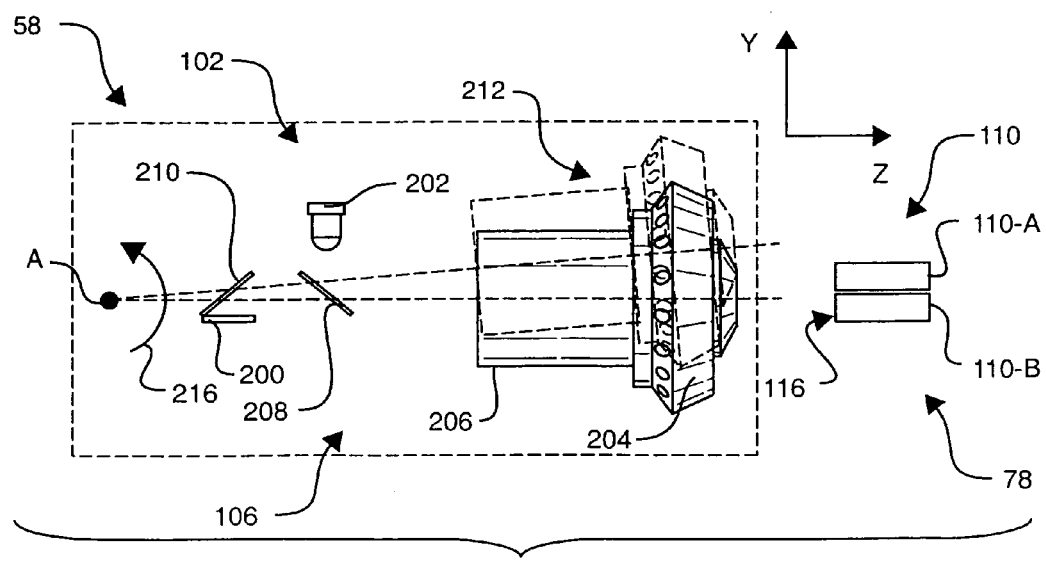
FIG. 9 is a side view of the various components of FIG. 8 when rotating about the point to obtain another image of the optical interface along the Y-axis.

FIGS. 8 and 9 illustrate a suitable way to maneuver the components of the inspection assembly 52 to obtain images of the ferrules 110. As shown in FIG. 8, the set of actuators 86 of the positioning subassembly 56 (also see FIG. 1) is configured to rotate the lens 206 and the dark field illuminator 204, hereinafter collectively referred to as the lens assembly 212, about the Y-axis. That is, the lens assembly 212 pivots about a point A within the X-Z plane to pan along the optical interface 116 of each ferrule 110 (see the arrow 214). Accordingly, in configurations in which the ferrules 110 provide rows of fiber ends along the X-axis as the optical interfaces 116, the lens assembly 212 incrementally pivots about a point A to individually aim at each fiber end.

Similarly, the set of actuators 86 (FIG. 1) is configured to rotate the lens assembly 212 about the X-axis to switch between each row of fiber ends on each ferrule 110. That is, the lens assembly 212 pivots about point A in the Y-Z plane (see the arrow 216) when switching between rows of fiber ends in a particular ferrule 110, and from ferrule 110 to ferrule 110 (e.g., when switching from inspecting the ferrule 110-A to the ferrule 110-B).

It should be understood that the set of actuators 86 of the positioning subassembly 56 is configured to move the lens assembly 212 along the Z-axis to precisely focus the images of the optical interfaces 116 onto the imaging sensor 200 (e.g., using an auto-focusing routine). In one arrangement, the controller 54 is configured to digitally transform the captured images into an equivalent coaxial view. That is, the controller 54 normalizes and adjusts the images to account for minor angular differences of the lens assembly 212 from fiber end to fiber end, and from ferrule 110 to ferrule 100. Further details of the invention will now be provided with reference to FIGS. 10 through 12.

Figure 10:
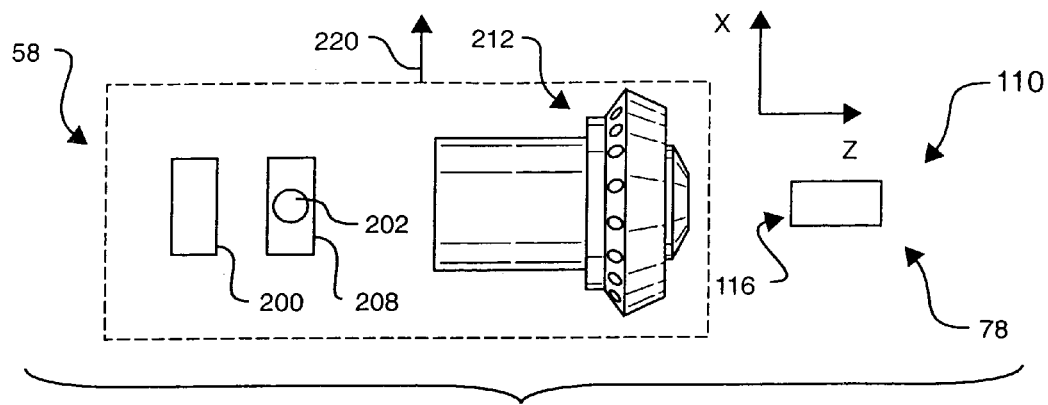
FIG. 10 is a top view of the various components of FIG. 6 illustrating translational movement the various components of FIG. 6 along the X-axis.
Figure 11:
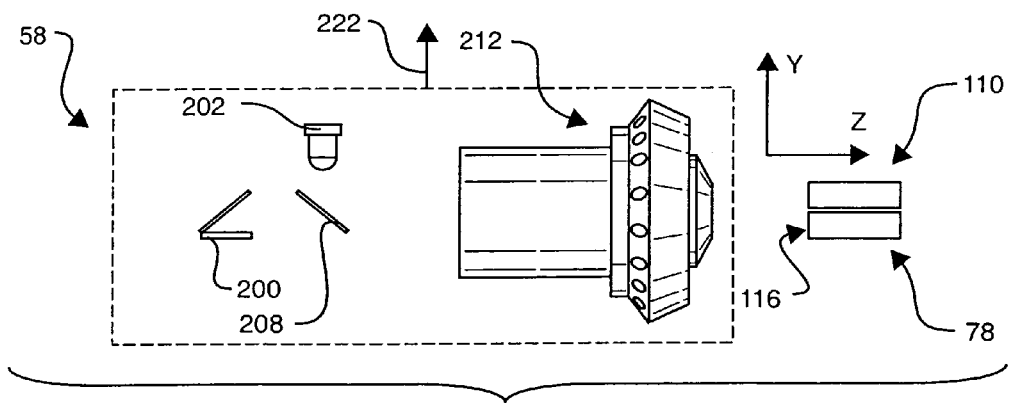
FIG. 11 is a side view of the various components of FIG. 6 illustrating translational movement the components of FIG. 6 along the Y-axis.
Figure 12:
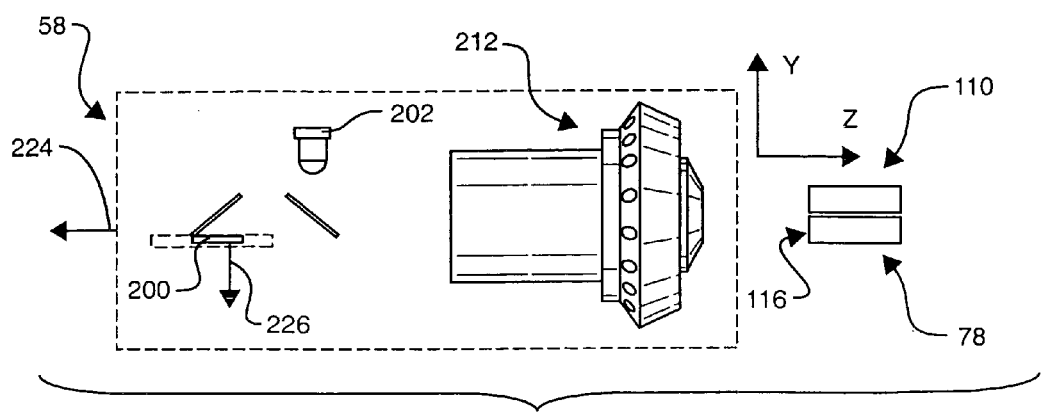
FIG. 12 is the side view of the various components of FIG. 6 illustrating focusing movements.

FIGS. 10 through 12 show an alternative way to maneuver the components of the inspection assembly 52 to obtain images of the ferrules 110. Again, the components move in response to movement of the actuators 86 under direction of the controller 54. FIG. 10 shows a top view of the components, and FIGS. 11 and 12 show side views of the components. As shown in FIG. 10, the entire sensor subassembly 58 moves along the X-axis in the X-Z plane when taking individual images of each fiber end (see the arrow 220). Similarly, as shown in FIG. 11, the entire sensor subassembly 58 moves along the Y-axis in the X-Z plane when taking individual images of each fiber end (see the arrow 222). Furthermore, as shown in FIG. 12, the entire sensor subassembly 58 moves along the Z-axis to provide fine focusing of the optical interface images onto the imaging sensor 200 (see the arrow 224). Further details of the invention will now be provided with reference to FIGS. 13 through 15.

Figure 13:
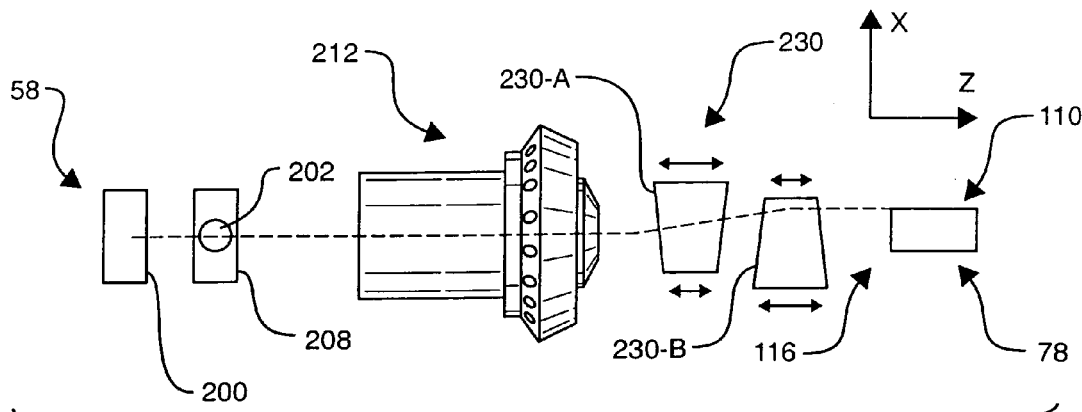
FIG. 13 is a top view of various components of the inspection assembly which employs prisms to aim a sensor subassembly along the X-axis.
Figure 14:
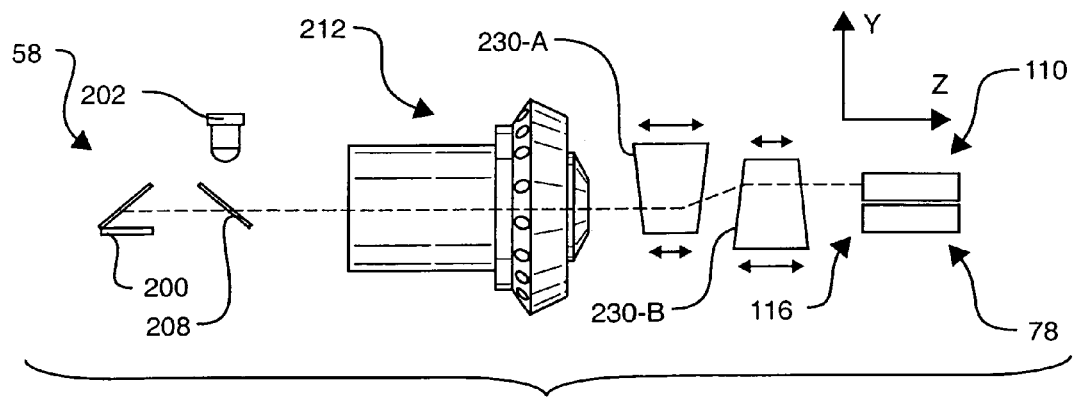
FIG. 14 is a side view of the various components of FIG. 13 which employs the prisms to aim the sensor subassembly along the along the Y-axis.
Figure 15:
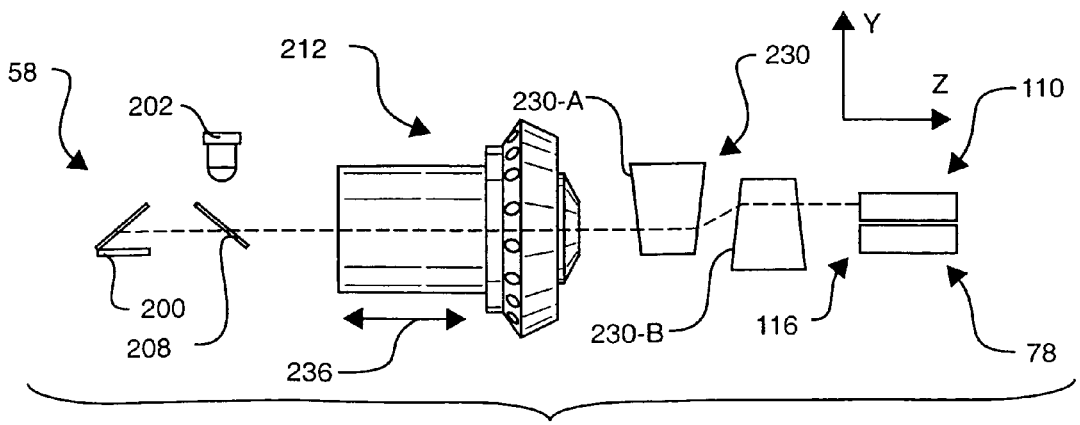
FIG. 15 is a side view of the various components of FIG. 13 illustrating focusing along the Z-axis.

FIGS. 13 through 15 show an alternative way to maneuver the components of the inspection assembly 52 to obtain images of the ferrules 110. As shown in FIGS. 13 through 15, the optics subassembly 106 further includes a set of prism members 230-A, 230-B (collectively, prism members 230) which is capable deforming light paths from the optical interfaces 116 toward the lens assembly 212. As will now be explained, the prism members 230 provide beam steering under direction of the controller 54. That is, actuators 86 in conjunction with the optics subassembly 106 (also see FIGS. 1 and 2) change the shapes of the prisms 230 in response to electronic signals from the controller 54. In response to the shape changes, the set of prisms 230 aim the lens assembly 212 at particular locations of the optical connector 78 (e.g., beam steering toward different fiber ends). FIG. 13 shows a top view of the components, and FIGS. 14 and 15 show side views of the components.

As shown in FIG. 13, the shapes of the prism members 230 changes to aim the sensor subassembly 58 along the X-axis (see small arrows adjacent the prisms 230). Similarly, as shown in FIG. 14, the shapes of the prism members 230 change to acquire images along the Y-axis. Furthermore, as shown in FIG. 15, the lens assembly 212 moves relative to the other components (e.g., relative to the prism members 230) to focus the images on the imaging sensor 200. Further details of the invention will now be provided with reference to FIGS. 16 through 18.

Figure 16:
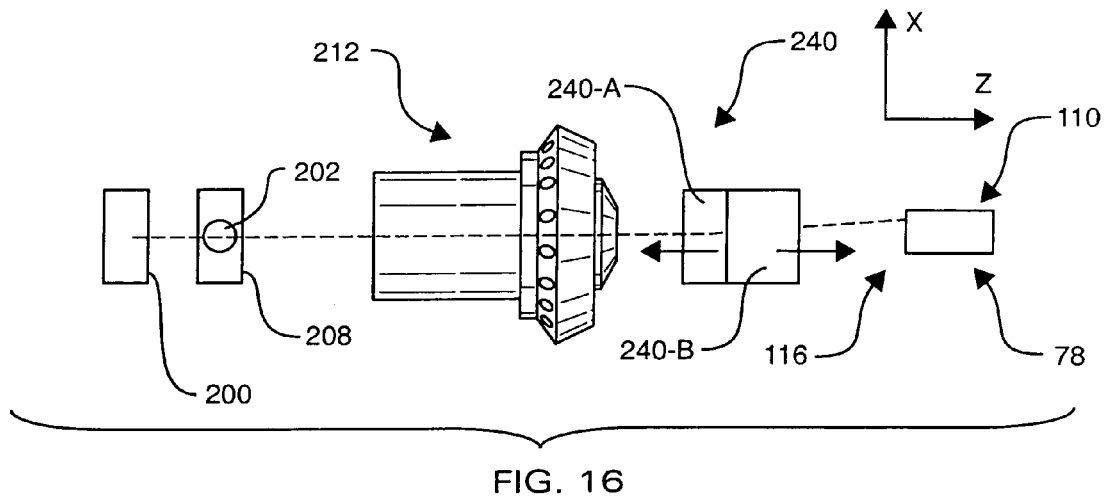
FIG. 16 is a top view of various components of the inspection system which employs mirrors to aim the sensor subassembly along the X-axis.
Figure 17:
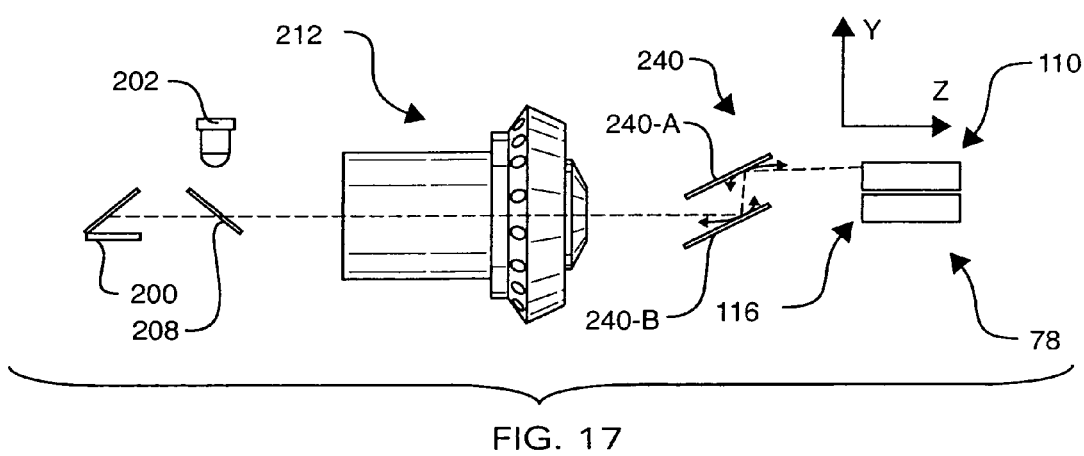
FIG. 17 is a side view of the various components of FIG. 16 which employs the mirrors to aim the sensor subassembly along the Y-axis.
Figure 18:
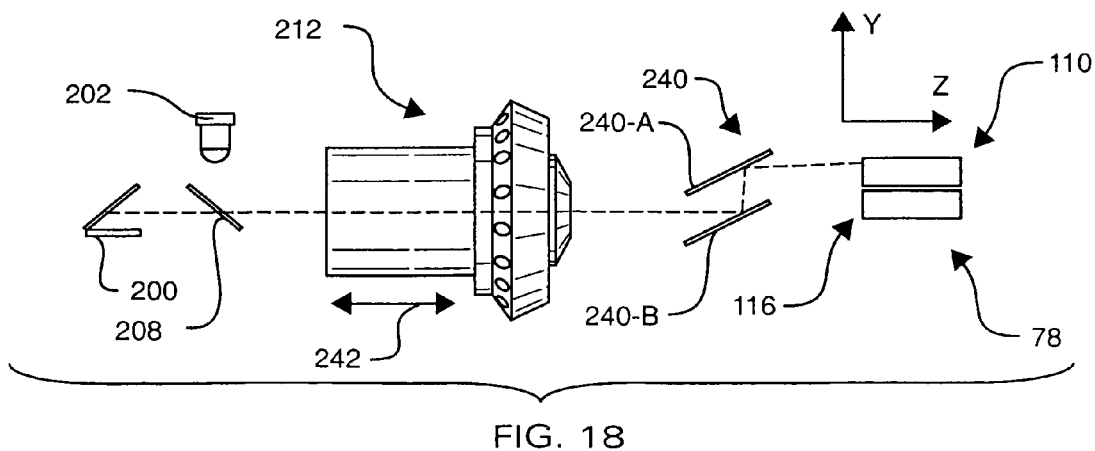
FIG. 18 is a side view of the various components of FIG. 16 illustrating focusing along the Z-axis.

FIGS. 16 through 18 show another alternative way to maneuver the components of the inspection assembly 52 to obtain images of the ferrules 110. As shown in FIGS. 16 through 18, the optics subassembly 106 further includes a set of mirrors 240-A, 240-B (collectively, mirrors 240) which is capable deflecting or redirecting light paths from the optical interfaces 116 toward the lens assembly 212. As will now be explained, the mirrors 240 operate as a beam steering periscope under direction of the controller 54. That is, the mirrors 240 rotate to aim the lens assembly 212 at particular locations of the optical connector 78. FIG. 16 shows a top view of the components, and FIGS. 17 and 18 show side views of the components.

As shown in FIG. 16, the mirrors 240 are configured to individually rotate relative to each other and relative to the lens assembly 212 and the ferrules 110 to bend the light path along the X-axis. Similarly, as shown in FIG. 17, the mirrors are configured to individually rotate relative to each other and relative to the lens assembly and the ferrules 110 to bend the light path along the Y-axis. Furthermore, as shown in FIG. 18, the lens assembly 212 moves relative to the other components along the Z-axis (e.g., relative to the mirrors 240) to focus the images on the imaging sensor 200 (see the arrow 242). Further details of the invention will now be provided with reference to FIGS. 19 through 21.

Figure 19:
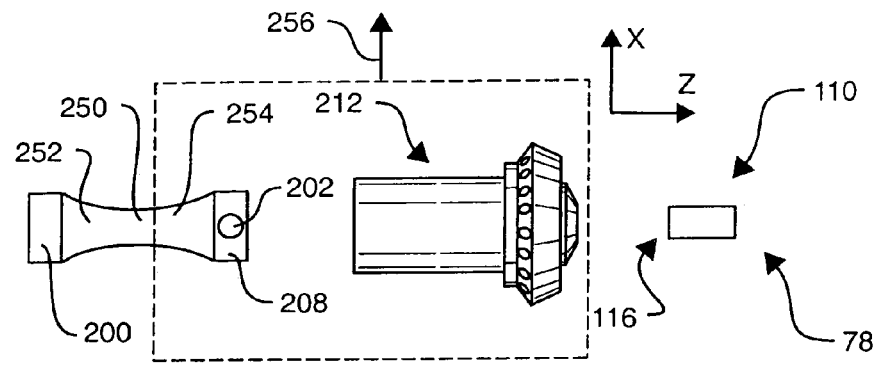
FIG. 19 is a top view of various components of the inspection assembly which employs a flexible fiber optic bundle to connect a fixed sensor to a moving optical assembly when aiming along the X-axis.
Figure 20:
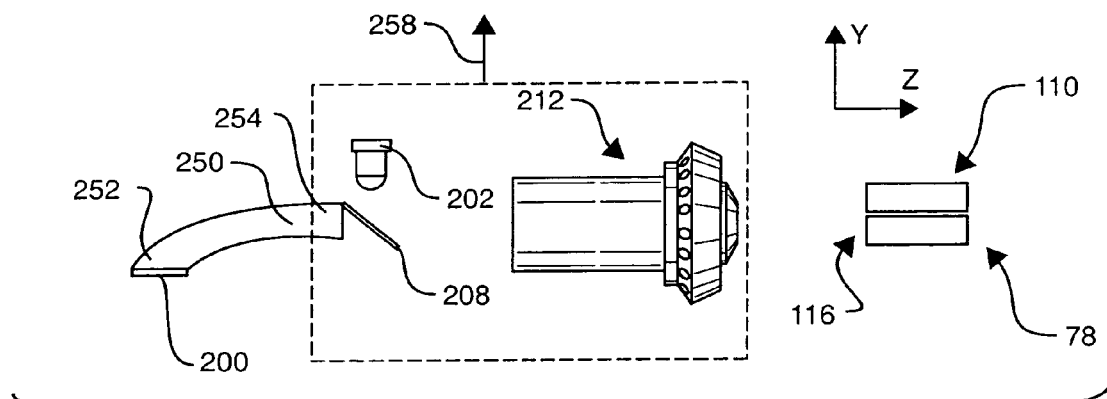
FIG. 20 is a side view of the various alternative components of FIG. 19 when aiming along the Y-axis.
Figure 21:
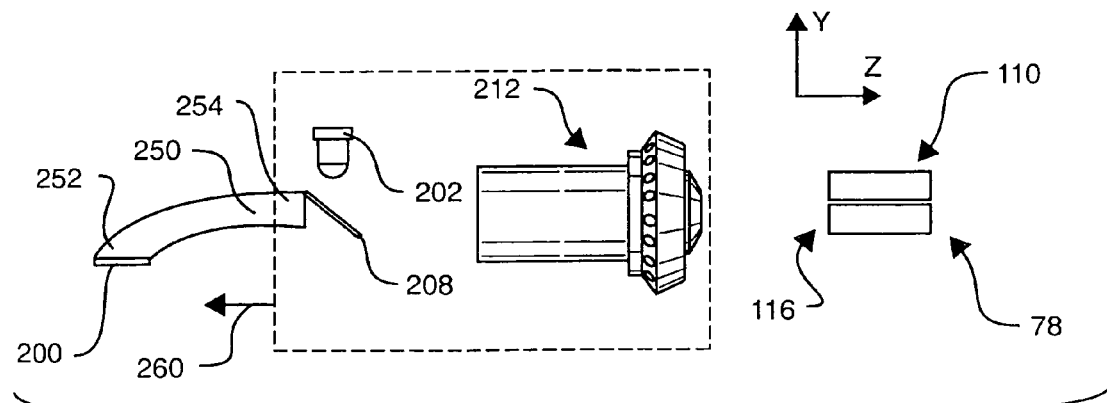
FIG. 21 is a side view of the various alternative components of FIG. 19 when focusing along the Z-axis.

FIGS. 19 through 21 show yet another alternative way to maneuver the components of the inspection assembly 52 to obtain images of the ferrules 110. As shown in FIGS. 19 through 21, the optics subassembly 106 includes a fiber optic cable bundle 250 having a stationary end 252 which points toward the imaging sensor 200 (under direction of the controller 54), and a movable end 254 which points toward the lens assembly 212. As shown in FIG. 19, the lens assembly 212 is capable of being aimed (e.g., by the set of actuators 86, also see FIG. 1) at various locations along the X-axis (see the arrow 256) and within the X-Z plane to capture different fiber ends along rows of fiber ends extending along the X-axis. The fiber optic cable bundle 252 is flexible, and the end 254 of the fiber optic cable bundle 250 (along with the LED 202 and the coaxial illumination beamsplitter 208) moves with the lens assembly 212 as the lens assembly 212 moves along the X-axis. However, the other end 252 of the fiber optic cable bundle 250 (and the imaging sensor 200) preferably remains in a constant position. It should be understood that the location of the other end 252 can be outside the card cage 72 (FIG. 1) and thus the side of the sensor 200 is not restricted or limited to the space in the card cage 72 (i.e., the size of the sensor 200 not restricted to the circuit board slot).

Similarly, as shown in FIG. 20, the lens assembly 212 is capable of being aimed at various locations along the Y-axis (see the arrow 258) and within the Y-Z plane to capture different fiber ends of different rows or of different ferrules 110. Again, the end 254 of the fiber optic cable bundle 250 moves with the lens assembly 212 when the lens assembly moves along the Y-axis while the sensor 200 remains stationary.

Furthermore, as shown in FIG. 21, the lens assembly 212 is movable along the Z-axis to precisely focus the images onto the imaging sensor 200 (see the arrow 260). As the lens assembly 212 migrates along the Z-axis, the end 254 of the flexible fiber optic cable bundle 250 follows the lens assembly 212. Further details of the invention will now be provided with reference to FIG. 22.

Figure 22:
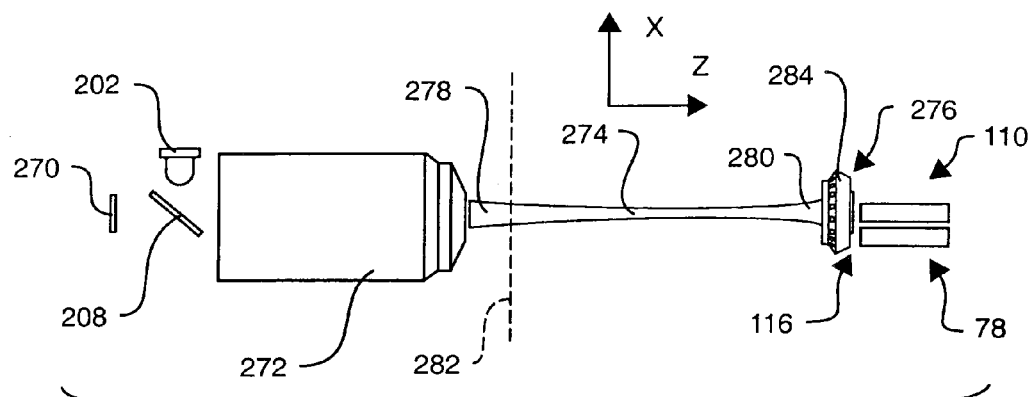
FIG. 22 is a side view of a borescope configuration for the inspection assembly.

FIG. 22 shows an alternative set of components of the inspection assembly 52. Here, the set of electronic sensors 64 of the sensor subassembly 58 includes an imaging sensor 270 (e.g., a CCD or CMOS sensor) which is similar to the imaging sensor 200 described above. However, the imaging sensor 270 resides well outside the fiber optic system 70 (also see FIG. 1). Accordingly, the imaging sensor 270 is not hindered by any size constraints as is the imaging sensor 200, i.e., the imaging sensor 270 does not need to fit onto the card-shaped member 84 and does not need to fit into the card cage 72.

As shown in FIG. 22, the optics subassembly 106 includes a first objective 272, a flexible fiber optic bundle 274 and a second objective 276 (shown generally by the arrow 276). The second objective 276 provides relatively low magnification. The flexible fiber optic bundle 274 has a first end 278 which aims toward the first objective 272 (under direction of the controller 54), and a second end 280 which aims toward the second objective 276. The fiber optic bundle 274 includes many small fibers (e.g., fibers having diameters of less than a micron) in order to convey images of the optical connector 78 (i.e., ferrule endface images) onto the first objective 272. The first object 272 then magnifies and focuses the images onto the imaging sensor 270. As with the imaging sensor 270, the object 272 resides outside the fiber optic system 70. This feature of the invention is illustrated by showing the edge 282 of the card-shaped member 84 (i.e., the imaging sensor 270 and the objective 272 reside off of the board 84).

In connection with FIG. 22, the actuators 86 move the end 280 of the fiber optic bundle 274 and the objective 276 along the X and Y axes to scan the optical interfaces 116 of the ferrules 110. The light source 102 (also see FIG. 2) is capable of providing coaxial illumination by lighting the fiber optic bundle 274, e.g., see the LED 202 and the two-way mirror 208. The light source 102 is also capable of providing dark field illumination using a darkfield illuminator 284, e.g., an outer core of fibers around the fiber optic bundle 274 is (i) disposed around an inner core of imaging fibers in a concentric manner and (ii) is angled to properly provide darkfield illumination. Further details of the invention will now be provided with reference to FIG. 23.

Figure 23:
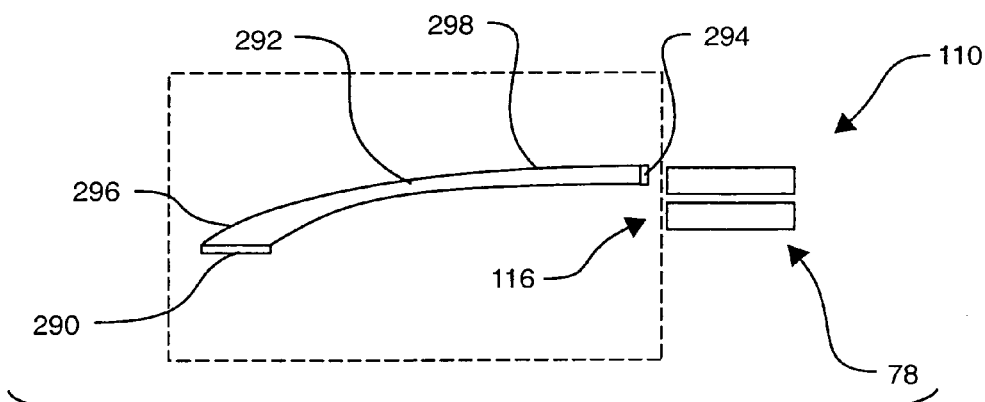
FIG. 23 is a side view of a fiber optic taper set of components for the inspection assembly.

FIG. 23 shows an imaging sensor 290, a fiber optic taper 292 and a low magnification objective 294. The actuators 86 (FIG. 1) are configured to move the components 290, 292, 294 together in the X and Y directions and thus scan the optical interfaces 116 of the ferrules 110. The fiber optic taper 292 has a first end 296 which couples to the imaging sensor 290 and a second end 298 which couples to the objective 294 (under direction of the controller 54). Accordingly, the objective 294 provides images of the optical interfaces 116 to the fiber optic taper 292, and the fiber optic taper 292 magnifies the images onto the imaging sensor 290. Again, the light source 102 is capable of providing coaxial illumination by lighting the fiber optic taper core, e.g., see the two-way mirror 208 shown for other variations above. Additionally, the light source 102 is capable of providing dark field illumination using an outer core of fibers concentric with the fiber optic taper 292 which is angled to properly provide darkfield illumination. Further details of the invention will now be provided with reference to FIGS. 24 and 25.

Figure 24:
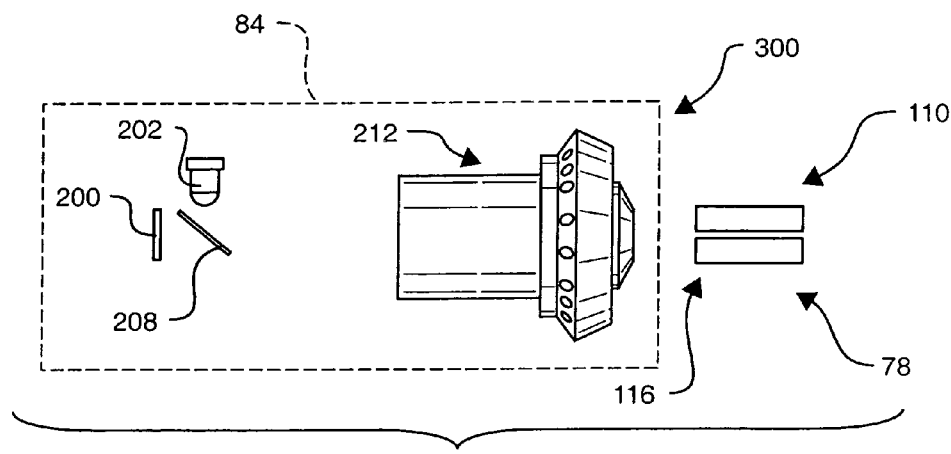
FIG. 24 is a side view of the various components of the inspection assembly illustrating the position of the components relative to a card-shaped member of the inspection assembly.
Figure 25:
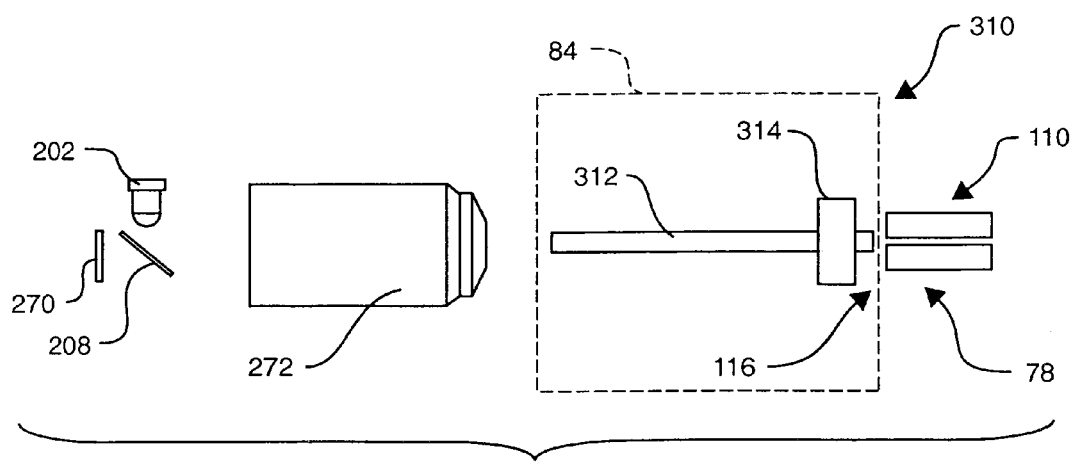
FIG. 25 is a side view of a microscope objective and fiber optic image relay configuration for the inspection assembly illustrating the position of components relative to the card-shaped member of the inspection assembly.

FIGS. 24 and 25 provide a comparison of two general configurations both of which are suitable for use by the invention. FIG. 24 shows a first configuration 300 in which essentially all of the components of the sensor subassembly 58 (FIG. 2) reside on the card-shaped member 84. The configuration is well-suited for the arrangements shown in FIGS. 6 through 20. In these arrangements, the sensor subassembly 58 is small enough and maneuverable so that the positioning subassembly 56 can move the entire sensor subassembly 58 in the X, Y and Z directions when inspecting the optical connector 78. That is, the entire sensor subassembly 58 fits within the size constraints of the fiber optic system 70 and the positioning subassembly 56. In one arrangement, the positioning subassembly 56 is capable of moving the sensor subassembly 58 as a single unit along all three axes.

In contrast, FIG. 25 shows a second configuration 310 in which not all of the sensor subassembly 58 fits within the size constraints of the fiber optic system 70 and the card-shaped member 84. The configuration is well-suited for the arrangements shown in FIG. 21. Here, the optics subassembly 106 includes an image relay system 312 (e.g., a grin lens or glass rod, a fiber bundle borescope, a lens based image relay system, etc.), and a darkfield illuminator 314 which are supported by and moved by the positioning subassembly 56. The image relay system 312 allows the imaging sensor 270 and the objective 272 to reside outside the card cage 72 and free of the card-shaped member 84. Accordingly, the sizes of the imaging sensor 270 and the objective 272 are not constrained by the size limitations of the fiber optic system 70 (e.g., the size of the card cage 72) and the positioning subassembly 56 for additional flexibility (e.g., to improve manufacturability using less expensive or more readily available components).

Further details of the invention will now be provided with reference to FIGS. 26 through 29. FIGS. 26 through 29 illustrate a variety of bearing configurations for the positioning subassembly 56 in order to provide support and stability to the sensor subassembly 58, but enable small movements of the sensor subassembly 58 (e.g., micro-movements or fine precision movements of the lens assembly 212) in order to aim at various locations along the ferrule endfaces. In these configurations, the actuators 86 are external to the bearings and not shown for simplicity.

Figure 26:
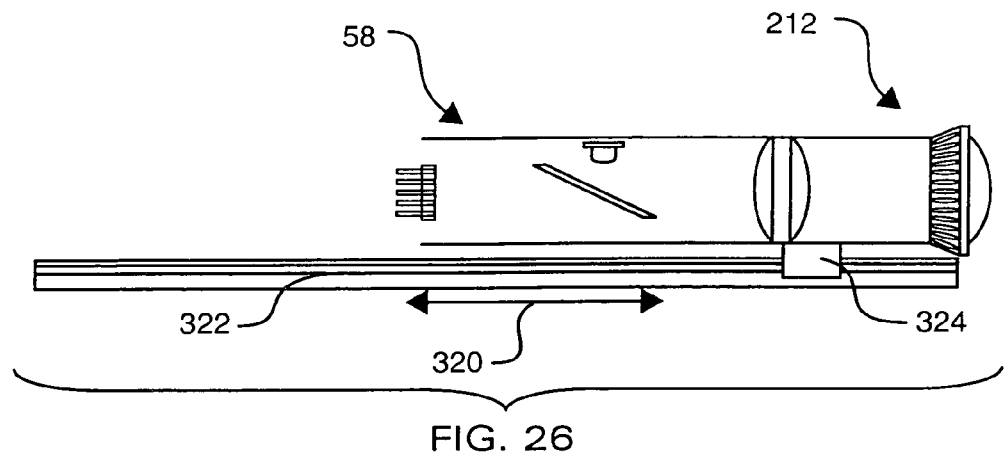
FIG. 26 is a side view of a rolling contact configuration for a positioning subassembly of the inspection system.

FIG. 26 shows a rolling contact configuration in which the positioning subassembly 56 enables sliding contact movement 320 (e.g., Z-directional movement) between a track 322 disposed on the card-shaped member 84 and a set of rolling contacts 324 such as a linear ball bearing which connect to the sensor subassembly 58. Such a sliding contact configuration is implementable using linear bearings that permit sliding movement of the sensor subassembly 58 through various locations along the track 322 see the arrow 320). That is, the track 322 is a ball rail where re-circulating ball bearings provide a rolling contact. In another arrangement, small wheels are used rather than ball bearings.

Figure 27:
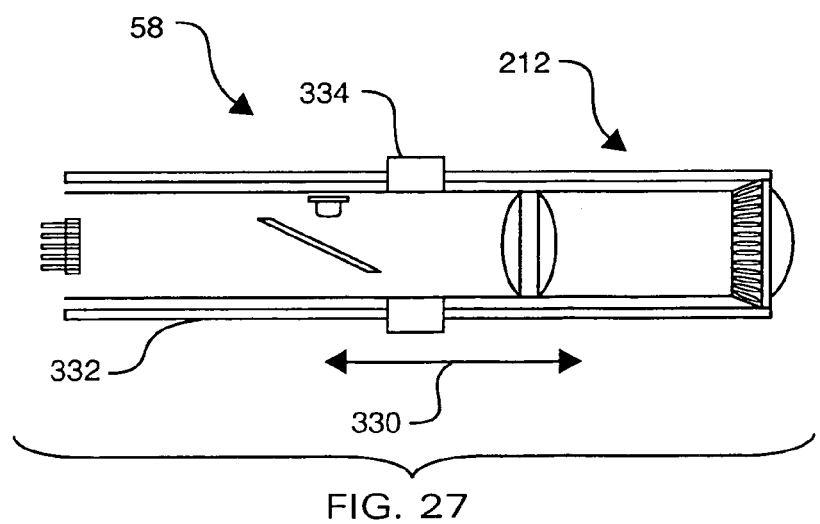
FIG. 27 is a side view of a sliding contact configuration for the positioning subassembly of the inspection system.

FIG. 27 shows a rolling contact configuration in which the positioning subassembly 56 enables rolling contact movement 330 (e.g., Z-directional movement) between a track 332 disposed on the card-shaped member 84 and a set of rolling contacts 334 (e.g., sliding polymer contacts on a rail) which connect to the sensor subassembly 58. Such a rolling contact configuration is implementable using linear bearings that permit movement of the sensor subassembly 58 through various locations along the track 332 (see the arrow 330).

Figure 28:
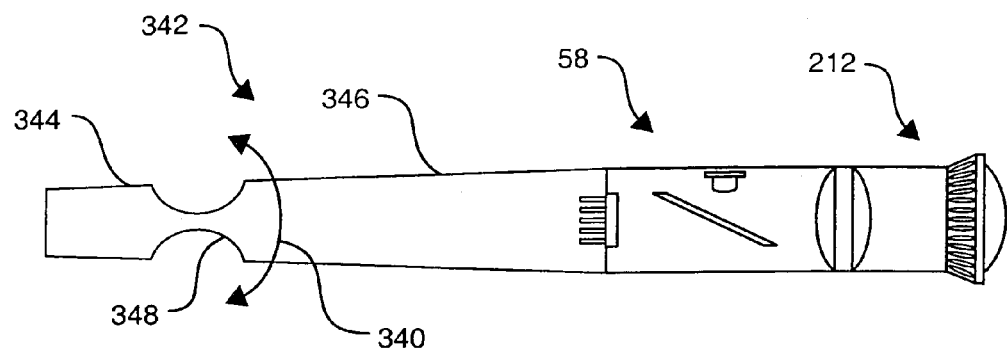
FIG. 28 is a side view of a flexure positioning subassembly of the inspection system.

FIG. 28 shows a rotational configuration in which the positioning subassembly 56 enables rotational movement 340 (e.g., see the arrow 340) of the sensor subassembly 58 using a rotational bearing arm. That is, the rotational configuration of FIG. 28 utilizes a flexible arm 342 having a fixed portion 344, a movable portion 346 and a flexible extension 348 that operates as a flexure thus enabling the sensor subassembly 58 to rotationally pivot about the fixed portion 344 in response to forces provided by the actuators 86. In particular, the fixed portion 344 is disposed on the card-shaped member 84, and the actuators 86 move the movable portion 346 (i.e., small high-precision movements) to aim the sensor subassembly 58 at various locations of the optical connector 78.

Figure 29:
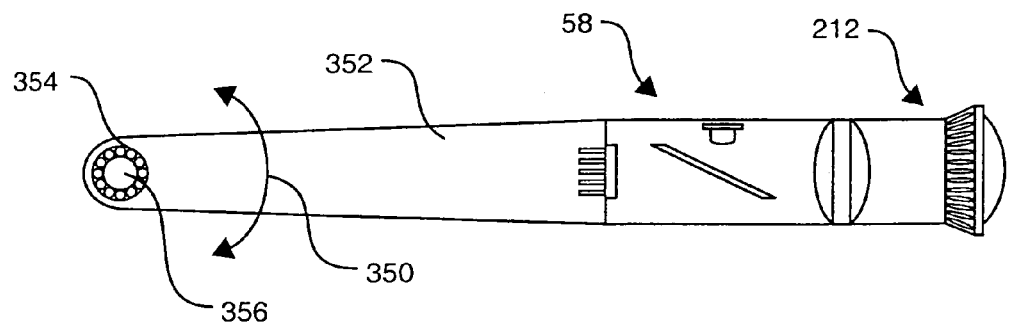
FIG. 29 is a side view of an alternative rotating positioning subassembly of the inspection system.

FIG. 29 shows another rotational bearing configuration in which the positioning subassembly 56 enables rotational movement 350 (e.g., see the arrow 350) of the sensor subassembly 58. The rotational configuration utilizes a rigid arm 352 and a set of bearings 354 that permits the rigid arm to rotate about an axle 356. For example, in one arrangement, the axle 356 forms part of a motorized rotary drive of the actuators 86 (FIG. 1). Accordingly, the axle 356 is pivotally coupled to the card-shaped member 84, and the actuators 86 move the rigid arm 352 relative to the card-shaped member 84 and the optical connector 78 under inspection (i.e., in small micro-angle movements) to aim the sensor subassembly 58 at various locations of the optical connector 78.

It should be understood that a variety of modifications and enhancements can be made to the configurations illustrated in FIGS. 26 through 29. In particular, the concepts of these configurations can be combined and improved to reliably and robustly provide support and stability to the sensor subassembly 58 when inspecting an optical connector 78.

Further details of the invention will now be provided with reference to FIGS. 30 through 35. FIGS. 30 through 35 show the various bearing configurations of FIGS. 26 through 29 when positioning the sensor subassembly 58 toward ferrule endfaces, i.e., optical interfaces 116 of an optical connector 78.

Figure 30:
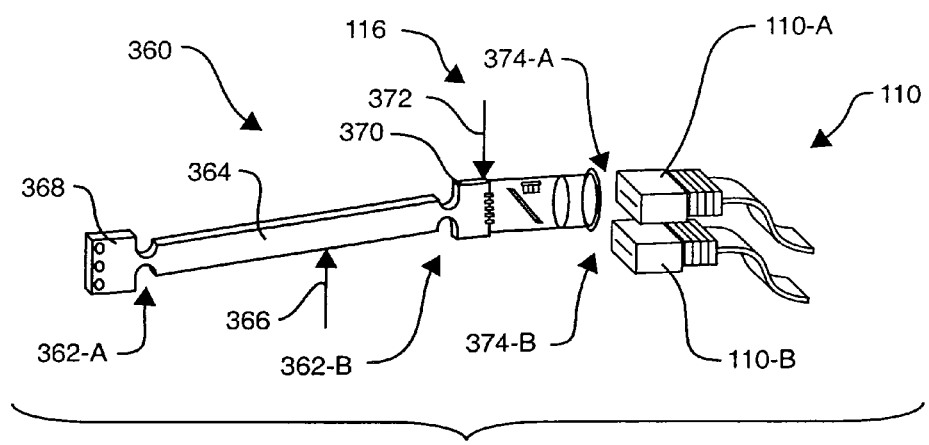
FIG. 30 is a perspective view of an alternative flex arm positioning subassembly of the inspection system when positioning the sensor subassembly adjacent a first ferrule of an optical connector.
Figure 31:
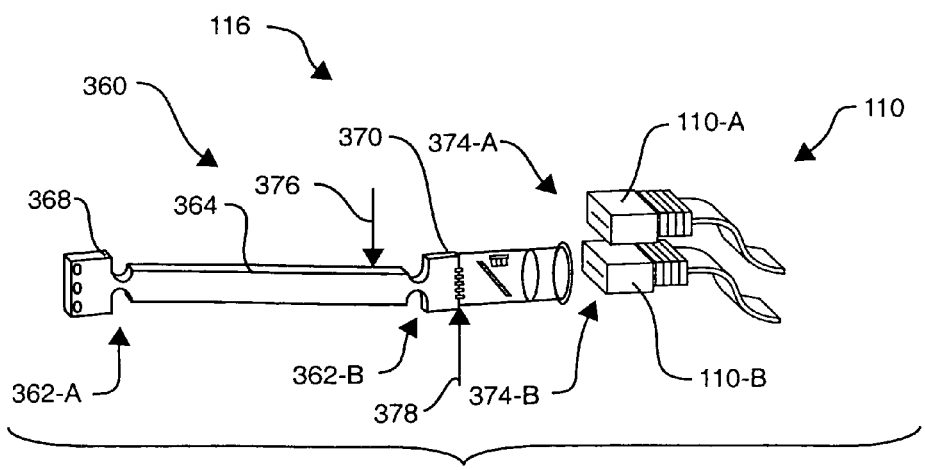
FIG. 31 is a perspective view of the alternative flex arm positioning subassembly of the inspection system when positioning the sensor subassembly adjacent a second ferrule of the optical connector.

In FIGS. 30 and 31, the positioning subassembly 56 includes a flexible arm 360 which is similar to the flexible arm 342 of FIG. 28, except that the flexible arm 360 includes multiple flexible extensions 362-A, 362-B for greater flexibility. Accordingly, the actuators 86 of the positioning subassembly 56 can maneuver and aim the sensor subassembly 58 at the ferrules 110 in a variety of ways. In particular, as shown in FIG. 30, the actuators 86 can deform a mid-portion 364 of the arm 360 in an upward direction by applying an upward force on the mid-portion 364 (see the arrow 366) relative to a fixed portion 368 of the arm 360, and simultaneously deform an end portion 370 of the arm 360 in a downward direction by applying a down force on the end portion 370 (see the arrow 372) to properly aim the sensor subassembly 58 at a fiber end 374-A of a first ferrule 110-A. Similarly, as shown in FIG. 31, the actuators 86 can deform a mid-portion 364 of the arm 360 in the downward direction (see the arrow 376) relative to the fixed portion 368 of the arm 360, and simultaneously deform the end portion 370 of the arm 360 in the upward direction (see the arrow 378) to properly aim the sensor subassembly 58 at a fiber end 374-B of a second ferrule 110-B.

Figure 32:
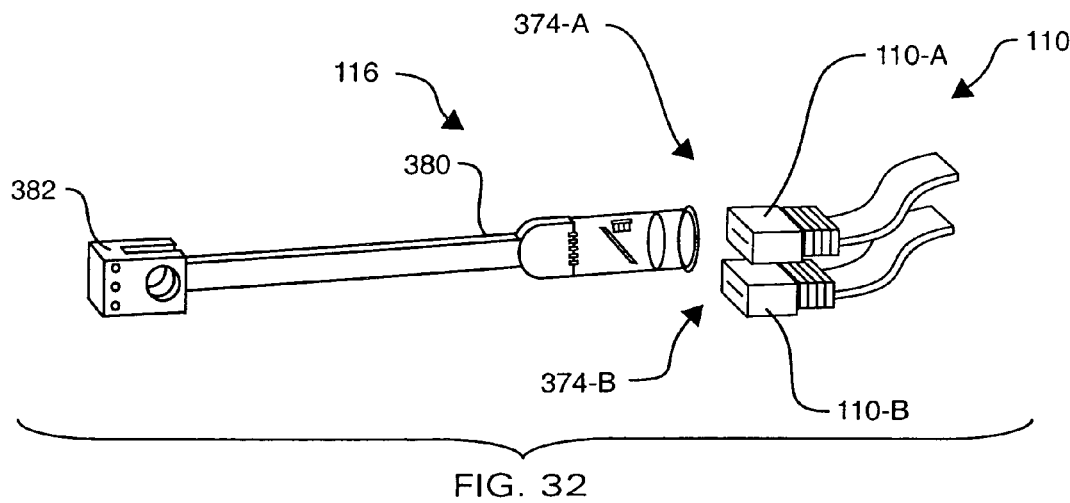
FIG. 32 is a perspective view of an alternative swing arm positioning subassembly of the inspection system when positioning the sensor subassembly adjacent a first ferrule of an optical connector.
Figure 33:
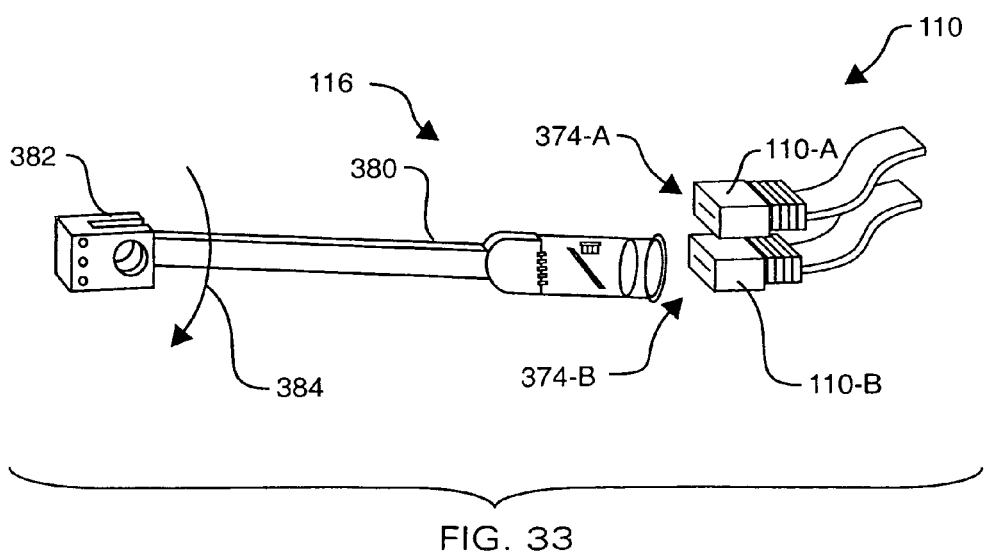
FIG. 33 is a perspective view of the alternative swing arm positioning subassembly of the inspection system when positioning the sensor subassembly adjacent a second ferrule of the optical connector.

In FIGS. 32 and 33, the positioning subassembly 56 includes a rigid arm 380 which pivotally fastens to a fixed member 382 for rotational movement. In FIG. 32, the sensor subassembly 58 aims at a fiber end 374-A of a first ferrule 10-A. In FIG. 33, the actuators 86 (e.g., a motor that turns the fixed member 382) of the positioning subassembly 56 rotate the sensor subassembly 58 about the fixed member 382 to aim at a fiber end 374-B of a second ferrule 110-B (see the arrow 384).

Figure 34:
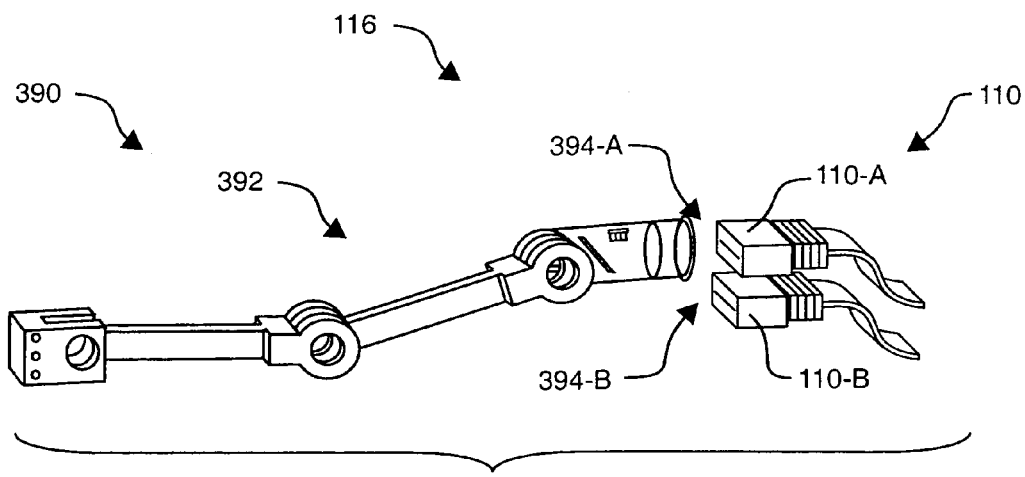
FIG. 34 is a perspective view of an alternative dual swing arm positioning subassembly of the inspection system when positioning the sensor subassembly adjacent a first ferrule of an optical connector.
Figure 35:
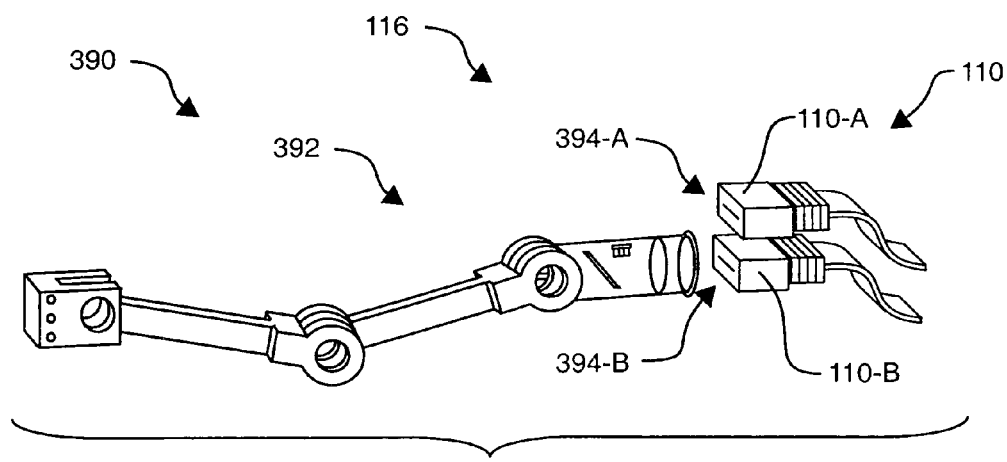
FIG. 35 is a perspective view of the alternative dual swing arm positioning subassembly of the inspection system when positioning the sensor subassembly adjacent a second ferrule of the optical connector.

In FIGS. 34 and 35, the positioning subassembly 56 includes a set of arms 390 which are pivotally coupled to each other and thus capable of rotating relative to each other for improved flexibility. As shown in FIG. 34, the actuators 86 (FIG. 1) rotate the set of arms 390 to a first set of orientations 392 to aim the sensor subassembly 58 at an endface 394-A of the first ferrule 110-A. Similarly, the actuators 86 (FIG. 1) rotate the set of arms 390 to a second set of orientations 396 to aim the sensor subassembly 58 at an endface 394-B of the second ferrule 110-B. Further details of the invention will now be provided with reference to FIGS. 36 through 38.

Figure 36:
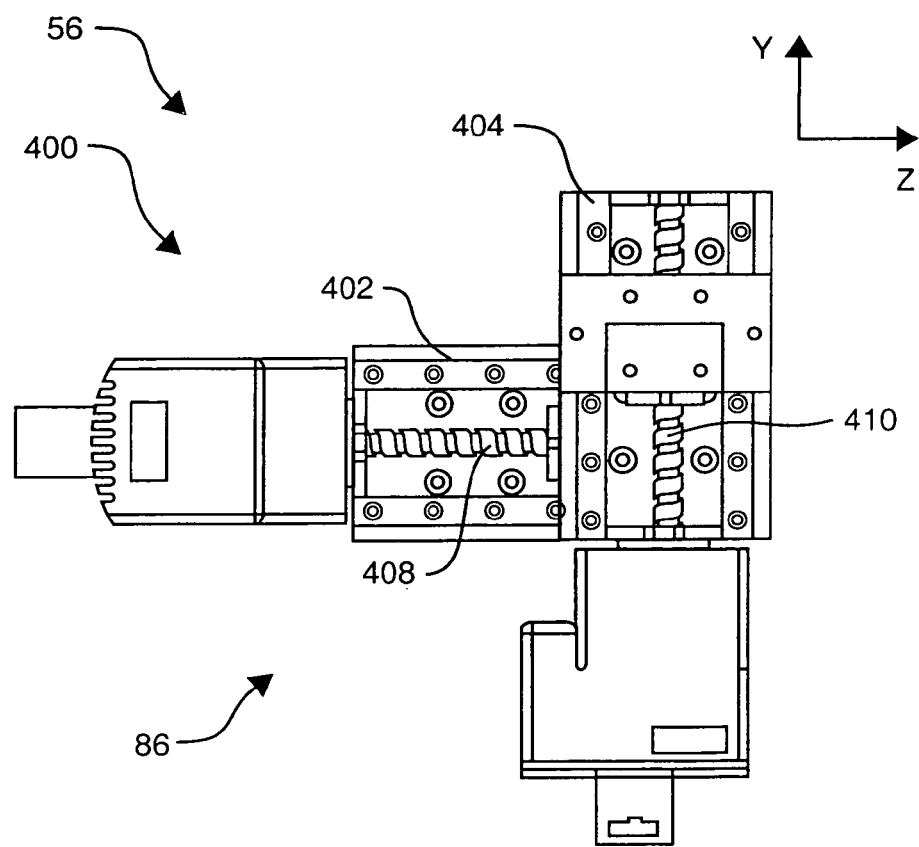
FIG. 36 is a side view of an alternative slide actuator positioning subassembly of the inspection system.
Figure 37:
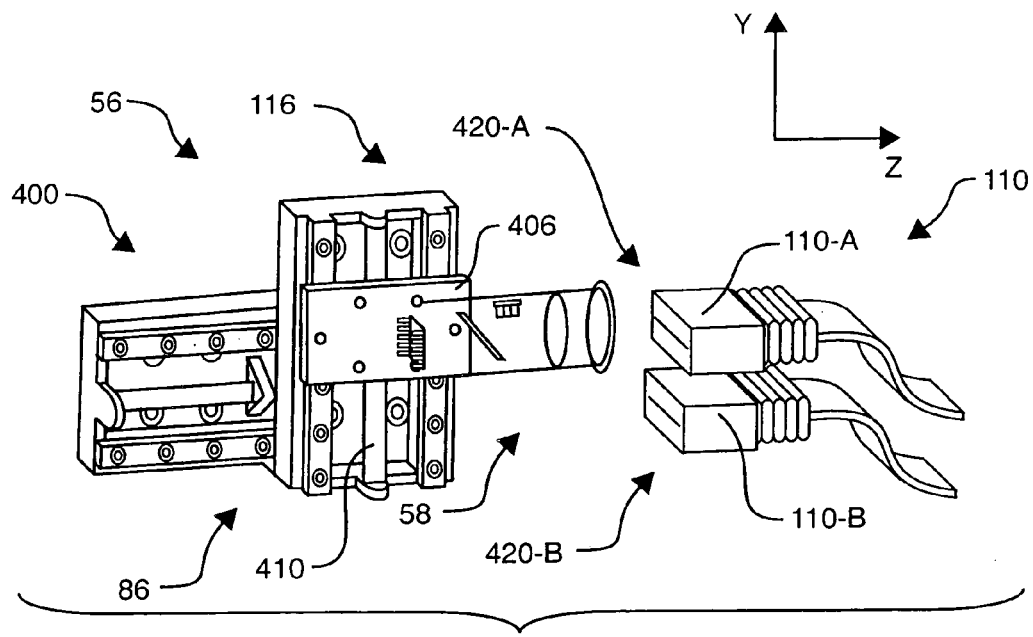
FIG. 37 is a perspective view of the alternative slide actuator positioning subassembly of the inspection system when positioning the sensor subassembly adjacent a first ferrule of an optical connector.
Figure 38:
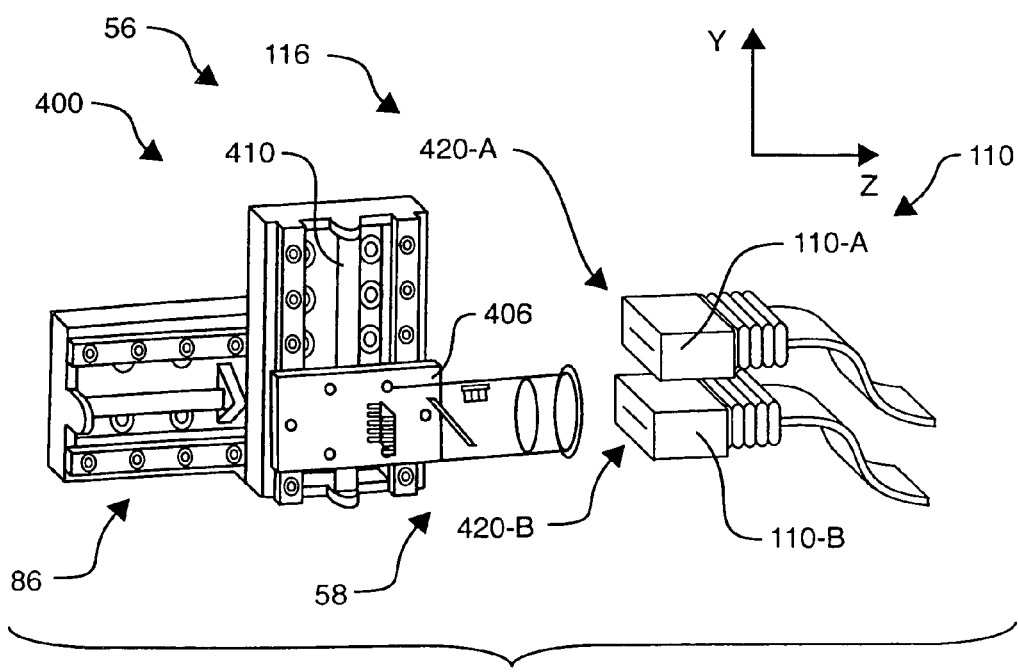
FIG. 38 is a perspective view of the alternative slide actuator positioning subassembly of the inspection system when positioning the sensor subassembly adjacent a second ferrule of the optical connector.

FIGS. 36 through 38 shows a configuration 400 which is suitable for use by the positioning subassembly 56. The configuration 400 uses bearing members with integrated actuators (see the actuators 86 of FIG. 1). As shown, the configuration 400 includes a mounting member 402, a first movable member 404 and a second movable member 406. The mounting member 402 is configured to mount to the card-shaped member 84, and the second movable member 406 is configured to mount to the sensor subassembly 58 (FIG. 1). The configuration 400 further includes a first actuator 408 (e.g., a screw-type actuator integrated within the mounting member 402) which rotates to move the first movable member 404 relative to the mounting member along the Z-axis. Similarly, the configuration 400 further includes a second actuator 410 (e.g., another screw-type actuator integrated within the first movable member 404) which rotates to move the second movable member 406 relative to the first movable member 404 along the Y-axis. Although not shown for simplicity, in one arrangement, the configuration 400 further includes another movable member and another actuator to provide movement in along the X-axis.

As shown in FIGS. 37 and 38, the configuration 400 positions the sensor subassembly 58 adjacent the endface 420-A of a first ferrule 110-A. To move the sensor subassembly 58 from the endface 420-A to the endface 420-B of a second ferrule 110-A, such as during an inspection operation (also see the procedure 160 of FIG. 5), the controller 54 sends actuation signals to the actuators 86. In particular, the actuator 410 moves the second movable member 406 along the Y-axis so that the sensor subassembly 58 now aims at the endface 420-B. Further details of the invention will now be provided with reference to FIG. 38.

Figure 39:
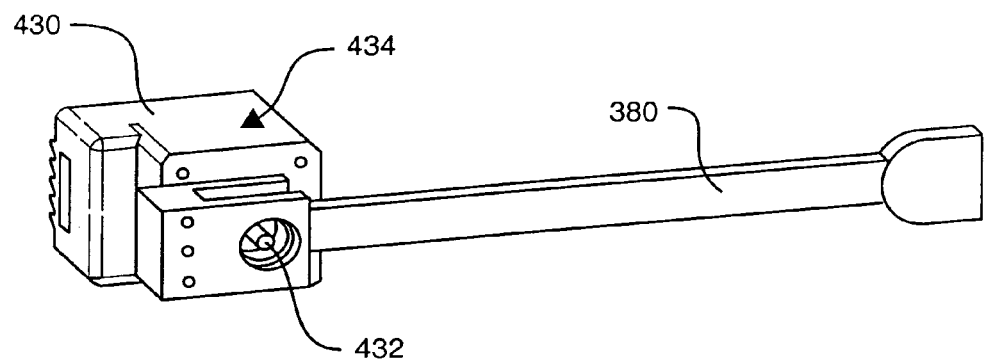
FIG. 39 is a perspective view of a motorized rotating actuator of the positioning subassembly which is suitable for positioning the sensor subassembly of the inspection system.

FIG. 39 shows an actuator 86 for the rigid arm 380 of FIGS. 32 and 33. As shown in FIG. 39, a rotary motor drive 430 forms one of the actuators 86 and provides rotational movement to the arm 380 about a rotating axle 432. In one arrangement, the controller 54 connects with feedback sensors 434 within the rotary motor drive 430 (shown generally by the arrow 432) in order to have control over positioning the arm 380 at particular angles. Accordingly, the controller 54 is capable of homing the sensor subassembly 58 (also see FIGS. 32 and 33) over a particular ferrule 110 or a fiber end of a particular ferrule 100 in response to a user simply inputting the coordinates into the I/O device 146 (FIG. 4). For example, if the user specifies fiber end #3 of the ferrule 110-A which, suppose by way of example only, has an optical interface 116 of eight fiber ends numbered 0 through 7, the user can simply enter a command such as "Goto fiber end #3 of Ferrule A" into the I/O device. The controller 54 responds by directing the positioning subassembly 56 (i.e., the rotary motor drive 430 and other actuators 86) to aim the sensor subassembly 58 at that fiber end. Further details of the invention will now be provided with reference to FIG. 40.

Figure 40:
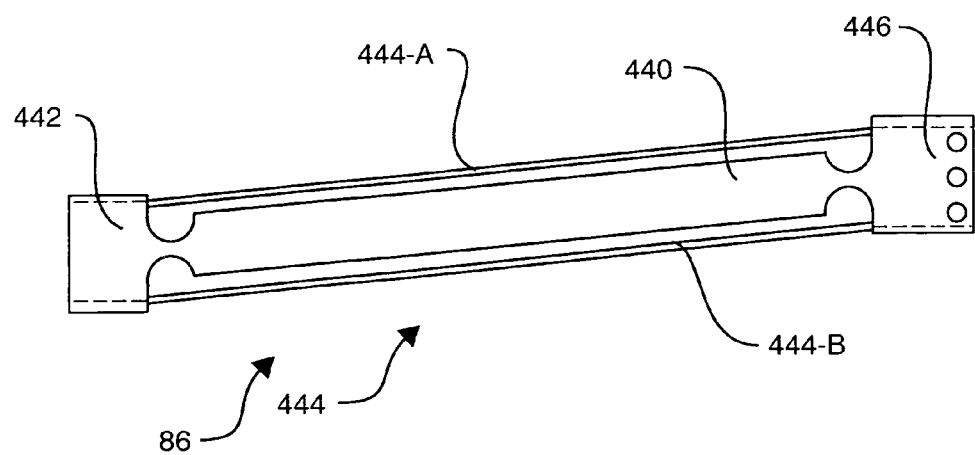
FIG. 40 is a side view of an alternative actuator of the positioning subassembly which is suitable for positioning the sensor subassembly of the inspection system.

FIG. 40 shows a flexible arm 440 having a fixed end 442 and a movable end 444. A set of shape memory alloy wires 444-A, 444-B pull on a movable far end 446 of the flexible arm 440 and control the orientation of the arm 440. In one arrangement, the wires 444 operate as some of the actuators 86 by changing length in response to temperature. A current through each wire 444 (e.g., under control by the controller 54) dictates the temperature and thus the length of each wire 444. Accordingly, when the sensor subassembly 58 mounts to the movable far end 446 of the arm 440, the sensor subassembly 58 steers toward various locations of an optical connector 78 by extending or shrinking the lengths of the wires 444-A, 444-B. In one arrangement, the wires 444-A, 444-B are composed substantially of titanium and nickel (e.g., TiNi wire) to provide strength and flexibility and positioning control accuracy. Further details of the invention will now be provided with reference to FIG. 41.

Figure 41:
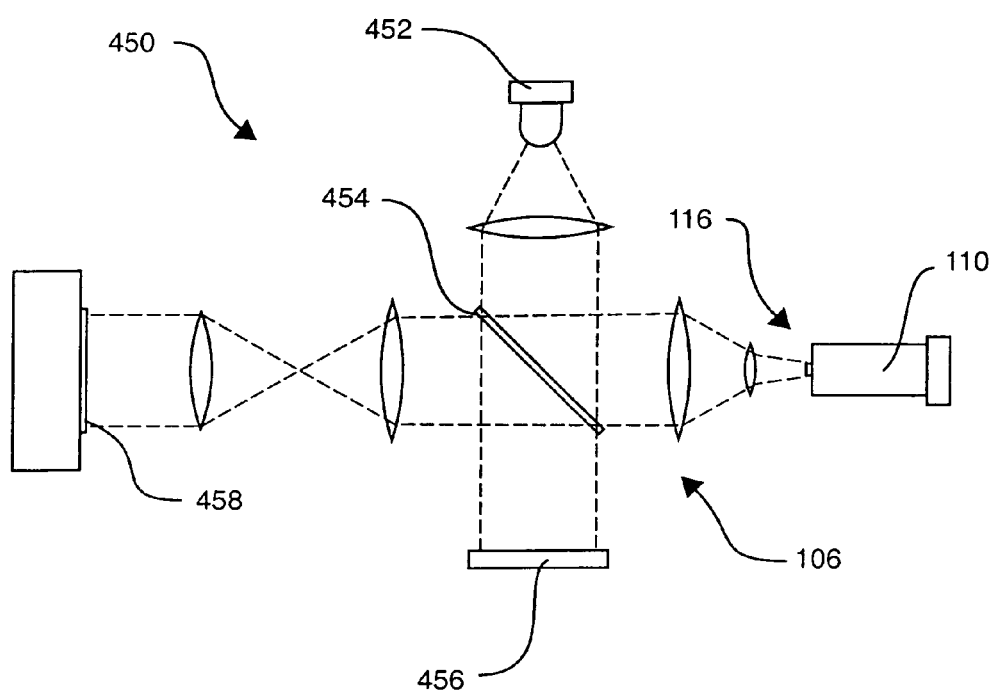
FIG. 41 is a side view of an interferometer configuration which is suitable for use by the inspection assembly.

FIG. 41 shows an interferometer configuration 450 for the sensor subassembly 58 which is suitable for use by the invention to inspect a ferrule 110. As shown, the configuration 450 includes a white light or monochromatic light source 452, a beam splitter 454, a flat reference 456, an image sensor 458 and an assembly of optics (see the optic subassembly 106 in FIG. 2). During operation, the configuration 450 operates to provide depth information relating to the ferrule endface surface 116. That is, the configuration 450 uses the interaction of light waves (i.e., interference) to measure the distances and angles on the ferrule endface surface 116 with high precision. Accordingly, the inspection system 50 can discover abnormal protrusions or depressions characterizing a damaged or contaminated optical interface 116.

Conclusion

As described above, the invention is directed to techniques for inspecting an optical connector 78 which involves electronically generating a result indicating an attribute of the optical connector 78 (e.g., "GOOD", "BAD", a score or rating indicating in a degree of damage, a coordinate of a defective fiber end, etc.). Such techniques tend to reduce the amount of manual effort and time required by the user relative to conventional approaches of studying optical interface images in real-time, or studying static pictures of optical interface images since the optical connector is capable of being automatically evaluated for the user. Furthermore, the electronically generated result tends to be more consistent and reliable since there is little or no opportunity for user subjectivity and/or error.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the inspection system 50 was described above as being configured to inspect a fiber optic system 70 having a card cage and backplane architecture by way of example only. It should be understood that the inspection system 50 is suitable for inspecting other types of fiber optic systems 70 as well such as patch panel or rack mounted fiber optic equipment, fiber optic backplanes without card cages, circuit boards having fiber optic components, etc.

Additionally, it should be understood that the imaging sensors 200, 270 were described above as being CCD or CMOS-type sensors by way of example only. Other types of sensors are suitable for use as well such as a row of scanning elements which is configured to scan or sweep in a direction that is substantially perpendicular to the row in order to form a two-dimensional image. In another arrangement, the imaging sensors 200, 270 use a two-dimensional array of elements to form a corresponding two-dimensional image. In another arrangement, the imaging sensors 200, 270 are standard digital cameras and the images of the optical interfaces are fed to the standard digital cameras through tube (e.g., as in a boroscope) or fiber bundle.

Furthermore, it should be understood that the light source 102 was described above as being an LED 202 that provides coaxial lighting in combination with a darkfield illuminator 204 that provides darkfield illumination, by way of example only. Accordingly, the user can select the type of lighting which is best suited for uncovering particular attributes of the optical connectors 78. In other arrangements, the light source 102 is configured to provide other types of illumination as well such as substantially polarized light, short-wavelength (e.g., blue) light, etc. The availability of different types of lighting provides a number of different inspection routines at the user's disposal which may reveal different details of the optical connector under inspection.

Additionally, it should be understood that the controller 54 was described above as being connected to a database 152 for difference analyses, by way of example only. In other arrangements, the controller 54 is periodically connected to the database 152 for updating purposes. For example, a technician can take the inspection system 50 out into the field to collect field data (i.e., images of optical connectors 78 after being use for some time). The technician can from time to time connect the inspection system 50 to the database 152 to either upload prior images for comparison purposes, or download the field data into the database 152 for later study (e.g., for trend analysis, to accumulate a traceable history for each fiber optic system 70, etc.).

Furthermore, it should be understood that the inspection system 50 was described above as being configured to inspect optical connectors 78 having multiple ferrules 110 by way of example only. The inspection system 50 is preferably configurable and well-suited for inspecting a variety of fiber optic connectors 78 such connectors with only one ferrule 110, or connectors with more than two ferrules 110 (e.g., four ferrules 110). Also, the inspection system 50 is well-suited for inspecting ferrules 110 that provide different numbers of fiber ends (e.g., one, two, four, multiple rows of fiber ends, etc.). Additionally, the inspection system 50 is configurable for a variety of different types of fiber optic connectors, e.g., connectors that require adaptors, connectors having ferrules with alignment pins, connectors with shutters, connectors without shutters, etc.

Figure 42:
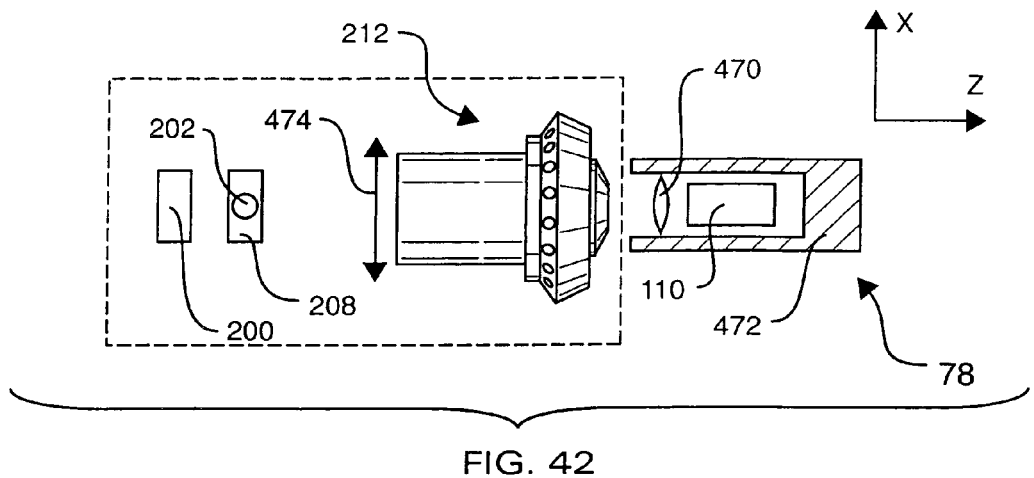
FIG. 42 is a top view of an alternative configuration for components of the inspection assembly illustrating movement in the X-direction when space immediately in front of the optical interface under inspection is very limited.
Figure 43:
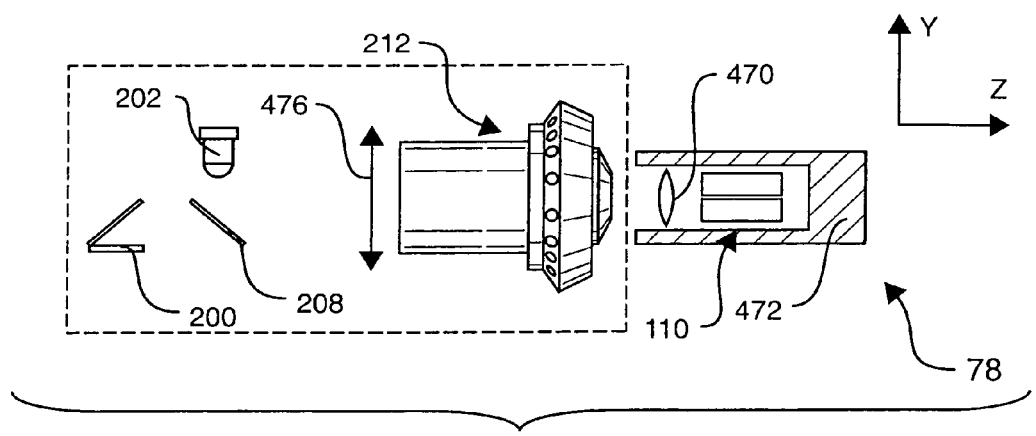
FIG. 43 is a side view of the alternative configuration of FIG. 42 illustrating movement in the Y-direction.
Figure 44:
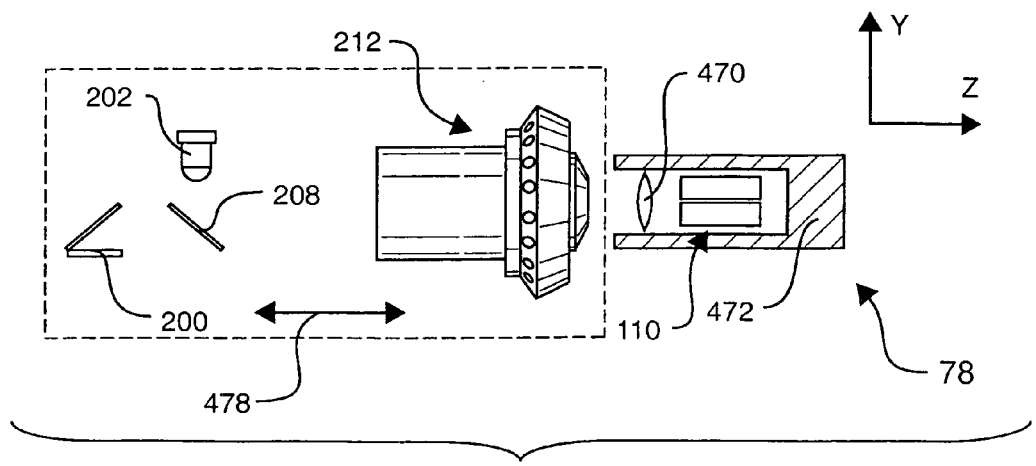
FIG. 44 is a side view of the alternative configuration of FIG. 42 illustrating movement in the Z-direction.

Additionally, it should be understood that sensor subassembly 58 is custom configurable to inspect particular types of optical connectors 78. For example, as shown in FIGS. 42 through 44, the optics subassembly 106 of the sensor subassembly 58 is capable of engaging with an optical connector 78. In particular, the optics subassembly 106 includes a lens 470 which inserts within a narrow protective housing 472 of the optical connector 78 very near the ferrules 110 under inspection. The lens assembly 212 (i.e., an objective lens and a darkfield illuminator, also see FIGS. 6 and 7) reside outside protective housing 472 and very close to the lens 470.

As shown in FIGS. 42 through 44, the lens assembly 212 remains movable in the X and Y directions for aiming at particular fiber ends, and in the Z-direction for focusing. In particular, as shown in the top view of FIG. 42, the lens assembly 212 is movable in the X-direction for scanning along the surface of each ferrule 110 (see the arrow 474). As shown in the side view of FIG. 43, the lens assembly 212 is movable in the Y-direction for scanning from ferrule 110 to ferrule 110, or from fiber row to fiber row on the same ferrule 110 (see the arrow 476). As shown in the side view of FIG. 44, the lens assembly 212 is movable in the Z-direction for focusing purposes (see the arrow 478).

This configuration is well-suited for applications in which space for moving the lens assembly 212 within the protective housing 472 is limited (i.e., there is only a small cavity). Here, the positioning subassembly 56 places the lens 470 close to the optical interface 116 under inspection, and the larger lens assembly 212 is free to move outside the protective housing for robust aiming and focusing, and enhanced imaging.

Furthermore, it should be understood that, in many of the arrangements described above, the lens assembly 212 was described as being in a constantly fixed position relative to the imaging sensor 200, the beam splitter 208 and the light source 202 (i.e., all of these components moved together as a single unit) by way of example only. In other arrangements, the components are movable relative to each other. For example, in one arrangement, the image sensor 200 is large enough that is fixed, and the lens assembly 212 is movable. As the lens assembly 212 moves (e.g., to obtain different fiber end images), the locations of the images on the imaging sensor 200 move. Nevertheless, the imaging sensor is still large enough to capture the images in their entirety. Similarly, in some arrangements, the light source 202 remains fixed but is robust enough to provide light (e.g., coaxial lighting) through the lens assembly 212 as the lens assembly 212 moves.

What is claimed is:

1. A method for inspecting an optical connector, the method comprising the steps of:
    positioning an electronic sensor over the optical connector;
    activating the electronic sensor to obtain a set of electronic signals which defines a set of current images of the optical connector; and
    electronically generating a result based on the set of electronic signals, the result indicating an attribute of the optical connector;
    wherein a set of actuators couples the electronic sensor to a card-shaped member;
    wherein the optical connector is disposed within a backplane which resides in a fixed position relative to a card cage; and
    wherein the step of positioning the electronic sensor includes the steps of:
    inserting the card-shaped member into the card cage and toward the backplane; and
    providing a set of actuator signals to the set of actuators to move the electronic sensor relative to the card-shaped member and over the optical connector disposed within the backplane.

2. The method of claim 1 wherein the step of activating the electronic sensor includes the step of:
    actuating a set of shutters from a first orientation which covers the electronic sensor to a second orientation which exposes the electronic sensor.

3. The method of claim 1 wherein the set of electronic signals includes (i) a digital code signal which represents a digital code on a surface of the optical connector, and (ii) a set of current image signals which defines the set of current images of the optical connector, and wherein the step of electronically generating the result includes the steps of:
    retrieving, based on the digital code signal, a set of prior image signals from a database, the set of prior image signals defining a set of prior images of the optical connector;
    outputting a difference signal based on a comparison of the set of current image signals with the set of prior image signals; and
    providing, as the attribute of the optical connector, an indication indicating whether the optical interface of the optical connector includes a defect based on the difference signal.

4. The method of claim 3 wherein the step of providing the indication includes the steps of:
    indicating that the optical connector does not include a defect when the difference signal is less than a predetermined threshold; and
    indicating that the optical connector includes a defect when the difference signal is greater than or equal to the predetermined threshold.

5. The method of claim 4 wherein the optical connector includes an optical interface having fiber ends at respective coordinates of the optical interface, and wherein the method further comprises the step of:
    when the optical connector includes a defect, providing a coordinate signal which identifies a coordinate of the optical interface to point out a respective fiber end of the optical interface having the defect.

6. The method of claim 3 wherein the digital code signal defines a matrix code on a surface of a ferrule of the optical connector, and wherein the step of retrieving the set of prior image signals includes the step of:
    selecting, based on the matrix code, the set of prior image signals from multiple sets of prior image signals residing in the database.

7. The method of claim 1, further comprising the step of:
    supplying light to the optical connector during the step of activating the electronic sensor.

8. The method of claim 7 wherein the step of supplying the light includes the step of:
    providing dark field illumination to the optical connector during the step of activating the electronic sensor.

9. The method of claim 7 wherein the step of supplying the light includes the step of:
    providing bright field illumination to the optical connector during the step of activating the electronic sensor.

10. The method of claim 7 wherein the step of supplying the light includes the step of:
    providing substantially white light to the optical connector during the step of activating the electronic sensor.

11. The method of claim 7 wherein the step of supplying the light includes the step of:

providing substantially short-wavelength light to the optical connector during the step of activating the electronic sensor.

12. The method of claim 1 wherein the optical connector includes an optical interface having multiple fiber ends, and wherein the step of activating the electronic sensor includes, for each fiber end of the optical interface, the steps of:
aiming the electronic sensor at that fiber end; and
forming a respective current image signal which defines a captured current image of that fiber end.

13. The method of claim 1 wherein the optical connector includes multiple optical interfaces, and wherein the step of activating the electronic sensor includes the steps of:
aiming the electronic sensor over a first optical interface of the optical connector and forming a first set of current image signals which defines a first set of current images of the first optical interface;
automatically moving the electronic sensor from a location over the first optical interface to a location over the second optical interface; and
aiming the electronic sensor over a second optical interface of the optical connector and forming a second set of current image signals which defines a second set of current images of the second optical interface.

14. The method of claim 1, further comprising the step of:
performing a cleaning operation on the optical connector prior to the step of activating the electronic sensor.

15. The method of claim 1, further comprising the steps of:
providing an activation signal to a ferrule of the optical connector; and
obtaining a radio frequency tag from the ferrule in response to the activation signal, the radio frequency tag being configured to identify the ferrule among multiple ferrules.

16. The method of claim 1, further comprising the step of:
emitting light from a light source against a surface of the optical connector to enable the electronic sensor to capture light reflected from the surface of the optical connector during activation of the electronic sensor.

17. A system for inspecting an optical connector, the system comprising:
a positioning subassembly;
an electronic sensor; and
a controller coupled to the positioning subassembly and the electronic sensor; the controller being configured to:
position the electronic sensor over the optical connector;
activate the electronic sensor to obtain a set of electronic signals which defines a set of current images of the optical connector; and
electronically generate a result based on the set of electronic signals, the result indicating an attribute of the optical connector;
wherein the positioning subassembly includes:
a card-shaped member, and
a set of actuators which couples the electronic sensor to the card-shaped member; and
wherein, when (i) the optical connector is disposed within a backplane which resides in a fixed position relative to a card cage, (ii) the card-shaped member is inserted into the card cage, and (iii) the controller positions the electronic sensor over the optical connector, the controller is configured to:
provide a set of actuator signals to the set of actuators to move the electronic sensor relative to the card-shaped member and over the optical connector disposed within the backplane.

18. The system of claim 17, further comprising:
a set of shutters; and
a set of motors coupled to the controller, the controller being configured to actuate the set of motors to move the set of shutters between a first orientation which covers the electronic sensor and a second orientation which exposes the electronic sensor.

19. The system of claim 17 wherein the set of electronic signals includes (i) a digital code signal which represents a digital code on a surface of the optical connector, and (ii) a set of current image signals which defines the set of current images of the optical connector, and wherein the controller, when electronically generating the result, is configured to:
retrieve, based on the digital code signal, a set of prior image signals from a database, the set of prior image signals defining a set of prior images of the optical connector;
output a difference signal based on a comparison of the set of current image signals with the set of prior image signals; and
provide, as the attribute of the optical connector, an indication indicating whether the optical interface of the optical connector includes a defect based on the difference signal.

20. The system of claim 19 wherein the controller, when providing the indication, is configured to:
indicate that the optical connector does not include a defect when the difference signal is less than a predetermined threshold; and
indicate that the optical connector includes a defect when the difference signal is greater than or equal to the predetermined threshold.

21. The system of claim 20 wherein the optical connector includes an optical interface having fiber ends at respective coordinates of the optical interface, and wherein the controller is further configured to:
provide, when the optical connector includes a defect, a coordinate signal which identifies a coordinate of the optical interface to point out a respective fiber end of the optical interface having the defect.

22. The system of claim 19 wherein the digital code signal defines a matrix code on a surface of a ferrule of the optical connector, and wherein the controller is configured to select, based on the matrix code, the set of prior image signals from multiple sets of prior image signals residing in the database.

23. The system of claim 17, further comprising:
a light source coupled to the controller, the controller being configured to turn on the light source to supply light to the optical connector when the controller activates the electronic sensor.

24. The system of claim 23 wherein the light source is configured to provide, at multiple depths, dark field illumination to the optical connector.

25. The system of claim 23 wherein the light source is configured to provide, at multiple depths, bright field illumination to the optical connector.

26. The system of claim 23 wherein the light source is configured to provide substantially white light to the optical connector.

27. The system of claim 23 wherein the light source is configured to provide substantially short-wavelength light to the optical connector.

28. The system of claim 17 wherein the optical connector includes an optical interface having multiple fiber ends, and wherein the controller, when activating the electronic sensor and for each fiber end of the optical interface, is configured to:
   aim the electronic sensor at that fiber end; and
   form a respective current image signal which defines a captured current image of that fiber end.

29. The system of claim 17 wherein the optical connector includes multiple optical interfaces, and wherein the controller, when activating the electronic sensor, is configured to:
   aim the electronic sensor over a first optical interface of the optical connector and forming a first set of current image signals which defines a first set of current images of the first optical interface;
   move the electronic sensor from a location over the first optical interface to a location over the second optical interface; and
   aim the electronic sensor over a second optical interface of the optical connector and forming a second set of current image signals which defines a second set of current images of the second optical interface.

30. The system of claim 17, further comprising:
   a cleaning subassembly coupled to the positioning subassembly, the cleaning subassembly being configured to perform a cleaning operation on the optical connector prior to the step of activating the electronic sensor.

31. The system of claim 17 wherein the electronic sensor is a linear array of sensor elements.

32. The system of claim 17 wherein the electronic sensor is a two-dimensional array of sensor elements.

33. The system of claim 17 wherein the optical connector is disposed on a backplane mounted to a card cage, and wherein the electronic sensor includes a lens subassembly to capture images when disposed within the card cage adjacent the optical connector.

34. The system of claim 17 wherein the optical connector is disposed on a backplane mounted to a card cage; and wherein the electronic sensor includes an elongated lens subassembly which is configured to capture images when a first end of the elongates lens subassembly is disposed adjacent the optical connector, and a second end of the elongated lens subassembly is disposed outside the card cage.

35. The system of claim 17 wherein the electronic sensor includes a fiber optic taper which is configured to transmit and transform images when disposed within the card cage adjacent the optical connector.

36. The system of claim 17, further comprising:
   a communications interface coupled to the controller, the controller being configured to direct the communications interface to:
      provide an activation signal to a ferrule of the optical connector; and
      obtain a radio frequency tag from the ferrule in response to the activation signal, the radio frequency tag being configured to identify the ferrule among multiple ferrules.

37. The system of claim 17, further comprising:
   a light source coupled to the controller, the light source being configured to emit light against a surface of the optical connector to enable the electronic sensor to capture light reflected from the surface of the optical connector during activation of the electronic sensor.

38. A computer program product that includes a computer readable medium having instructions stored thereon for inspecting an optical connector such that the instructions, when carried out by a computer, cause the computer to:
   position an electronic sensor over the optical connector;
   activate the electronic sensor to obtain a set of electronic signals which defines a set of current images of the optical connector; and
   electronically generate a result based on the set of electronic signals, the result indicating an attribute of the optical connector;
   wherein a set of actuators couples the electronic sensor to a card-shaped member;
   wherein the optical connector is disposed within a backplane which resides in a fixed position relative to a card cage; and
   wherein the computer, when positioning the electronic sensor, is configured to:
      insert the card-shaped member into the card cage and toward the backplane, and
      provide a set of actuator signals to the set of actuators to move the electronic sensor relative to the card-shaped member and over the optical connector disposed within the backplane.

39. The computer program product of claim 38 wherein the instructions, when carried out by the computer, further cause the computer to:
   emit light from a light source against a surface of the optical connector to enable the electronic sensor to capture light reflected from the surface of the optical connector during activation of the electronic sensor.

* * * * *